US011613817B2

United States Patent
Stowell et al.

(10) Patent No.: US 11,613,817 B2
(45) Date of Patent: Mar. 28, 2023

(54) NEGATIVE EMISSION, LARGE SCALE CARBON CAPTURE FOR CLEAN FOSSIL FUEL POWER GENERATION

(71) Applicant: Lyten, Inc., San Jose, CA (US)

(72) Inventors: Michael W. Stowell, Sunnyvale, CA (US); Lauren Sienko, Champaign, IL (US)

(73) Assignee: Lyten, Inc., San Jose, CA (US)

( * ) Notice: Subject to any disclaimer, the term of this patent is extended or adjusted under 35 U.S.C. 154(b) by 0 days.

(21) Appl. No.: 17/889,120

(22) Filed: Aug. 16, 2022

(65) Prior Publication Data

US 2023/0060531 A1 Mar. 2, 2023

Related U.S. Application Data

(60) Provisional application No. 63/234,322, filed on Aug. 18, 2021.

(51) Int. Cl.
*B01J 19/08* (2006.01)
*C25B 1/135* (2021.01)
(Continued)

(52) U.S. Cl.
CPC ............. *C25B 1/135* (2021.01); *B01J 19/088* (2013.01); *B01J 19/126* (2013.01);
(Continued)

(58) Field of Classification Search
CPC ....... C25B 1/135; B01J 19/088; B01J 19/126; B01J 2219/0803; B01J 2219/0884;
(Continued)

(56) References Cited

U.S. PATENT DOCUMENTS 9,767,992 B1 9/2017 Stowell et al.
9,812,295 B1 * 11/2017 Stowell ............ H01J 37/32192
(Continued)

FOREIGN PATENT DOCUMENTS

EP 3978428 A1 4/2022

OTHER PUBLICATIONS

Stowell et al., U.S. Appl. No. 17/889,152, filed Aug. 16, 2022.
(Continued)

*Primary Examiner* — Xiuyu Tai
(74) *Attorney, Agent, or Firm* — Zilka-Kotab, P.C.

(57) ABSTRACT

Systems and methods for eliminating carbon dioxide and capturing solid carbon are disclosed. By eliminating carbon dioxide gas, e.g., from an effluent exhaust stream of a fossil fuel fired electric power production facility, the inventive concepts presented herein represent an environmentally-clean solution that permanently eliminates greenhouse gases while at the same time producing captured solid carbon products that are useful in various applications including advanced composite material synthesis (e.g., carbon fiber, 3D graphene) and energy storage (e.g., battery technology). Capture of solid carbon during the disclosed process for eliminating greenhouse gasses avoids the inefficiencies and risks associated with conventional carbon dioxide sequestration. Colocation of the disclosed reactor with a fossil fuel fired power production facility brings to bear an environmentally beneficial, and financially viable approach for permanently capturing vast amounts of solid carbon from carbon dioxide gas and other greenhouse gases that would otherwise be released into Earth's biosphere.

20 Claims, 19 Drawing Sheets

(51) Int. Cl.
*B01J 19/12* (2006.01)
*C01B 32/16* (2017.01)

(52) U.S. Cl.
CPC .................. *B01J 2219/0803* (2013.01); *B01J 2219/0884* (2013.01); *B01J 2219/0894* (2013.01); *B01J 2219/0898* (2013.01); *B01J 2219/1206* (2013.01); *C01B 32/16* (2017.08)

(58) Field of Classification Search
CPC ........ B01J 2219/0894; B01J 2219/0898; B01J 2219/1206; B01J 12/002; B01J 6/008; B01J 19/08; B01J 12/005; B01J 12/02; B01J 2219/0875; B01J 2219/0883; B01J 2219/1269; B01J 19/085; B01J 2219/0801; B01J 2219/1281; B01J 2219/0809; C01B 32/16; C01B 32/174; C01B 32/184; C01B 32/194; C01B 32/205; C01B 32/152; C01B 32/15; C01B 32/80; C01B 32/18; C01B 32/164; C01B 32/158; C01B 32/50; C01B 32/40; C01B 32/186; B01D 53/02; B01D 2256/16; B01D 2257/702; H01J 37/32266; H01J 37/32229; H01J 37/32788; H01J 23/00; H01J 37/3277; H01J 2237/33; H01J 37/32201; H01J 37/32743; H01J 25/00; H01J 25/50; H01J 2237/332; H01J 2237/334; H01J 37/32192; H01J 37/3244; H01J 37/32844; C23C 16/26; C23C 16/511; C23C 16/515; C23C 16/453; H01L 21/31116; H01L 21/32136; H01L 21/02274; H01L 21/28556; H03K 3/78; H03B 9/10; B82Y 40/00; Y02C 20/30; Y02C 20/40; F25J 3/08; H05H 1/28; H05H 1/4622; H05H 1/30; H05H 1/46
See application file for complete search history.

(56) References Cited

U.S. PATENT DOCUMENTS

| | | | |
|---|---|---|---|
| 10,781,103 | B2 | 9/2020 | Tanner et al. |
| 11,107,662 | B2 | 8/2021 | Stowell et al. |
| 2007/0051615 | A1* | 3/2007 | Holcomb ............. B01D 53/323 422/186.04 |
| 2012/0232173 | A1 | 9/2012 | Juranitch et al. |
| 2012/0272655 | A1 | 11/2012 | ELKady et al. |
| 2016/0244683 | A1 | 8/2016 | Gomaa et al. |
| 2016/0354754 | A1 | 12/2016 | Hirson et al. |
| 2019/0055655 | A1* | 2/2019 | Xia ..................... B01D 5/0057 |
| 2020/0350144 | A1 | 11/2020 | Chambers et al. |

OTHER PUBLICATIONS

Stowell et al., U.S. Appl. No. 17/889,184, filed Aug. 16, 2022.
Li et al., "Non-thermal plasma-assisted capture and conversion of C02," Chemical Engineering Journal, vol. 410, 2021, pp. 1-7.
Li et al., "C02 capture and activation with a plasma-sorbent system," Chemical Engineering Journal, vol. 430, 2022, pp. 1-9.
McGurk et al., "Microwave swing regeneration of aqueous monoethanolamine for post-combustion CO2 capture," Applied Energy, vol. 192, 2017, pp. 126-133.
George et al., "A Review of Non-Thermal Plasma Technology: A novel solution for CO2 conversion and utilization," Renewable and Sustainable Energy Reviews, vol. 135, 2021, pp. 1-22.
International Search Report and Written Opinion from PCT Application No. PCT/US2022/040645, dated Jan. 20, 2023.
Harder et al., "Homogeneous CO2 conversion by microwave plasma: Wave propagation and diagnostics," Plasma Processes and Polymers, 2016, pp. 1-24.

\* cited by examiner

9C00

9D00

9E00

9F00

9K00

9L00

NEGATIVE EMISSION, LARGE SCALE CARBON CAPTURE FOR CLEAN FOSSIL FUEL POWER GENERATION

RELATED APPLICATIONS

The present application claims priority to U.S. Provisional Patent Application No. 63/234,322, filed Aug. 18, 2021 and entitled "High-Efficiency Carbon Capture for Clean Fossil Fuel Power Production," the contents of which are herein incorporated by reference.

FIELD OF THE INVENTION

This disclosure relates to green power production technology, especially processing carbon dioxide and other greenhouse gases. More particularly, the inventive concepts presented herein relate to techniques for high-efficiency carbon capture for clean fossil fuel power production that also yields useful carbon-based by-products, resulting in an overall negative emissions profile.

BACKGROUND

One approach to address global climate change involves isolating carbon dioxide from the atmosphere by deploying air-to-carbon-dioxide removal plants around the world, and then sequestering that carbon dioxide, e.g., in deep underground reservoirs. To appreciate the scale necessary to achieve carbon reduction goals, approximately 40,000 installations of air-to-carbon-dioxide removal plants that correspond to the over 40,000 or more fossil fuel-fired electricity generation plants around the world would be required to isolate the carbon dioxide generated by these fossil fuel-fired electricity generation plants.

Even if these air-to-carbon-dioxide removal plants were able to operate at an economic efficiency level of few hundred dollars per ton, the significant problems associated with moving the carbon dioxide to storage sites makes the carbon dioxide sequestration approach virtually unachievable. At the scale necessary to achieve proposed carbon reduction goals, moving carbon dioxide to sequestration sites would require an estimated 65,000 miles of pipeline for the United States alone. Unfortunately, geopolitical pressures render sequestration approaches impractical, even if the cost of the pipelines were to be borne by sovereign nation government entities.

Accordingly, what is needed are systems and techniques for preventing the carbon dioxide generated from combustion at fossil fuel-fired electricity generation plants from entering the biosphere in the first place. The inventive concepts presented herein address problems associated with greenhouse gases at the source, rather than attempting to recapture such greenhouse gases after release into the biosphere.

SUMMARY

A processing reactor receives an effluent exhaust gas stream (e.g., from a coal-fired or natural gas-fired electricity generation facility). The effluent exhaust gas stream is directed through a high frequency, atmospheric pressure, non-equilibrium plasma to break apart target molecules such as carbon dioxide, carbon monoxide, and unspent hydrocarbons.

The elements released from these cracked molecules are then controlled by an electromotive force to maintain separation, modulate ion lifetimes, and allow for recombination of oxygen, nitrogen, and hydrogen atoms into $O_2$, $N_2$, and $H_2O$. These benign (or in the case of oxygen, beneficial) resultant gases can then be released into the surrounding environment or used for other purposes.

Meanwhile, carbon solids are captured and collected for industrial and manufacturing uses. Notably, the processing reactor facilitates tuning of the plasma such that desired species of carbon solids (e.g., graphene) are produced as by-products.

These carbon solid by-products may be employed directly in a variety of applications, including but not limited to production of advanced composite materials, industrial diamond, carbon fiber, carbon-based building materials, polymer and chemical synthesis, etc., as well as in energy storage applications, sensor technology, and aerospace applications, among others.

According to one aspect, a method for producing solid carbon from carbon dioxide gas and water includes: receiving carbon dioxide and water in a reactor configured to generate a plasma; dissociating the carbon dioxide and the water using the plasma to form one or more dissociated species; exposing the dissociated species to an electric field configured to facilitate one or more chemical reactions; generating solid carbon via the chemical reactions; and outputting the solid carbon from the reactor.

Further details of aspects, objectives, and advantages of the technological aspects are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
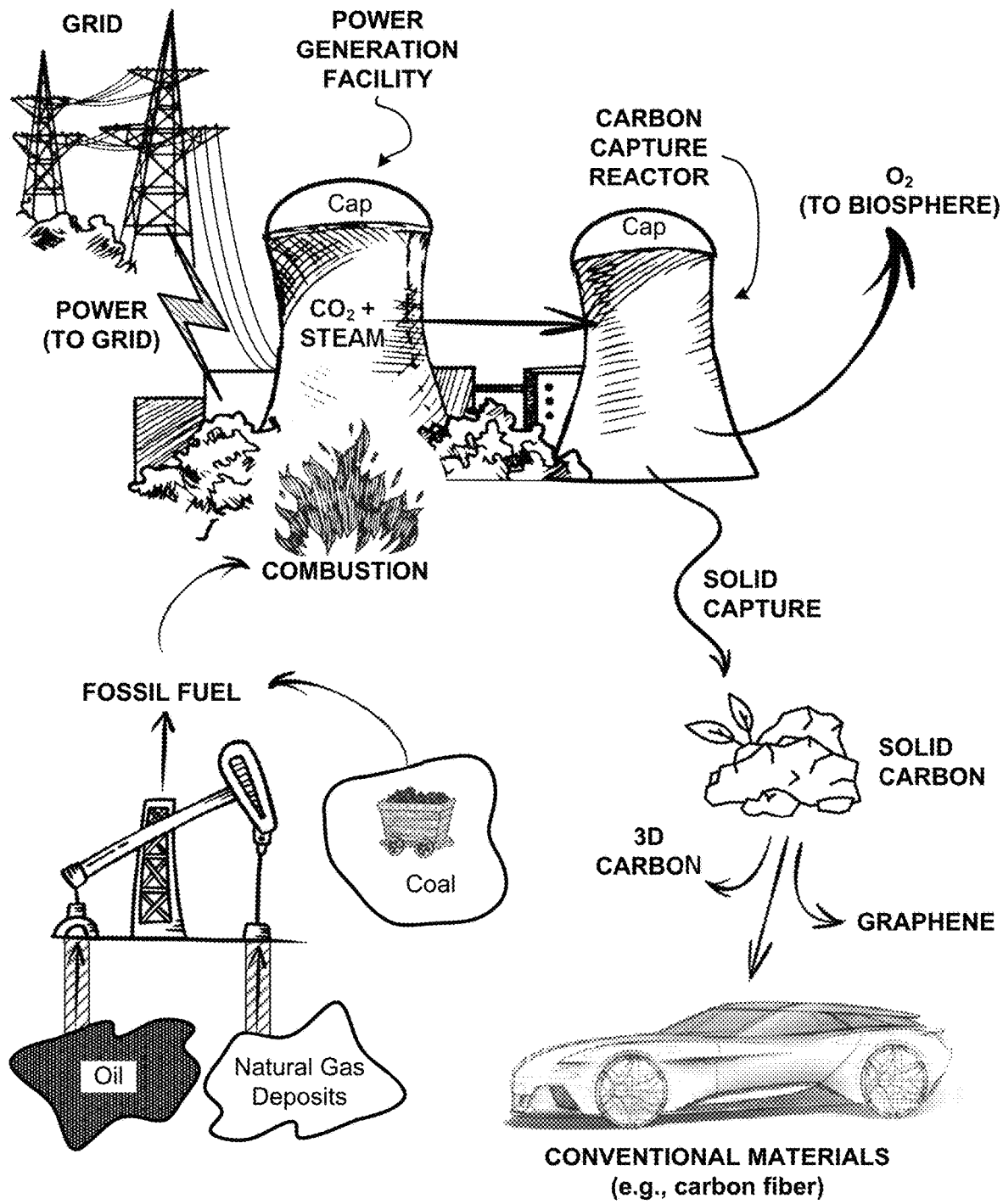
FIG. 1 illustrates an exemplary negative emission reactor coupled to a fossil fuel power production facility and configured to generate useful carbon solid by-products, in accordance with one aspect.

Many long-term strategies for combating climate change count heavily on the ability to capture and sequester the huge amounts of carbon dioxide that result from burning fossil fuels. The intent is to sequester it permanently in deep underground rock formations. Unfortunately, high costs of sequestration and lingering technical uncertainties mean the foregoing carbon capture and storage (CCS) strategies may not contribute significantly in reducing global carbon dioxide emissions into the environment.

A recent report from the International Energy Agency (IEA) warns that the development and deployment of CCS is "seriously off pace" as a way to prevent the average global temperature from rising more than 2° C. The window to begin applying CCS toward consequential emissions reduction is "shrinking fast," and the IEA has declared that CCS must supply over a fifth of the emissions reductions needed by the year 2050 to keep the temperature rise below 2° C.

All told, today's sequestration capture technologies sequester only about 20 million metric tons of carbon dioxide per year. By comparison, coal burning in the United States and China alone accounts for approximately 7 billion metric tons of carbon dioxide emissions each year.

To meet the 2° C. goal, the IEA states a minimum of 110 additional projects at power plants and industrial facilities should be brought online by 2020—with at least enough capacity to capture and store 269 million metric tons of carbon dioxide that year. Although many large-scale projects are in planning or construction phases, it can take more than a decade to build a new CCS project. The conventional CCS strategy presents a colossal example of "too little too late".

Even worse, the foregoing problems with the CCS strategy are further complicated by the fact that techniques for chemically and/or mechanically separating carbon dioxide from plant exhaust or natural gas streams are expensive and fraught with complex processing logistics. Firstly, before the gas can be buried, it must be compressed to a supercritical state and then transported (e.g., via pipeline) to the injection site—both of which are very expensive processes. As such, CCS adds too much to the price of power production for CCS to serve as a cost-effective solution.

Additional details regarding separating carbon solids from gases can be found in U.S. Pat. No. 10,781,103, filed Feb. 22, 2019 and entitled "Microwave Reactor System with Gas-Solids Separation," the contents of which are herein incorporated by reference.

Secondly, traditional carbon sequestration technologies rely on the availability of sequestration locations for permanent storage of the emitted carbon dioxide. Many sequestration locations have not proven to be viable and/or have not lived up to the hope. For example, many proposed underground sequestration sites have been met with political challenges by the public. As another example, the permeability of deep saline cavities is very low, making it hard to get the fluid into the rock. Furthermore, studies have shown that delivering sufficiently large volumes into these cavities is not feasible without the potential for triggering earthquakes. Worse, such earthquakes that might occur on faults could let the sequestered gas escape.

Even if the technological and political problems associated with securing and maintaining sequestration sites are solved, current carbon capture/sequestration methods simply divert $CO_2$ into these sites. Unfortunately, this merely postpones dealing with the existence of super-large volumes of greenhouse gasses phase and other pollutants.

Indeed, long term prospects for sequestration and plasma-based solid carbon capture contrast starkly. While sequestration costs tend to rise over time, e.g., due to limited availability of sequestration sites, and increasing regulations on carbon, plasma-based solid carbon capture is projected to exhibit continuing cost decreases due to improved efficiency and growing maturity of resale markets for the solid carbon products.

To take full advantage of these projected cost decreases, carbon capture must be deployed on a large scale. To illustrate this scale, consider that on a typical summer day, the greater Los Angeles area demands well over 5 GW of peak power from its fossil fuel fired electric generation plants. If implementing carbon capture at a 5 GW power plant, approximately 500 MW of input electricity is required to dissociate greenhouse gases into capturable carbon solids. This can be implemented using about seven 75 MW klystron-based microwave energy emitters. Optionally, a larger number of lesser-powered microwave energy emitters may be used.

Application of the disclosed techniques eliminates sequestration by chemically deconstructing the pollutant species into benign constituents. Additionally, application of the disclosed techniques provides many environmental and economic benefits by returning the captured constituent elements (e.g., C and O2) for use in other applications. Still further advantages of plasma-based solid carbon capture techniques over traditional sequestration are given in Table 1.

TABLE 1

Plasma-based solid carbon capture process offers significant cost and environmental advantages over state-of-the-art carbon sequestration methods

| Impact | Traditional Sequestration | Solid Carbon Capture Solutions |
| --- | --- | --- |
| Long Term Issues | CO2 remains intact; and is likely to leak back into the environment over time | No negative environmental impact |
| Capital Expenditure | High (~$200M) | Low (~$20M) |
| Impact on Atmosphere | Loss of oxygen | Oxygen returned to atmosphere |

TABLE 1-continued

Plasma-based solid carbon capture process offers significant cost and environmental advantages over state-of-the-art carbon sequestration methods

| Impact | Traditional Sequestration | Solid Carbon Capture Solutions |
|---|---|---|
| Usable Output | None | Carbon, oxygen, syngas |
| Markets For Output | None | Carbon fiber, bricks, CO |
| Energy Cost | 10-20% of power plant energy output | 10-20% of power plant energy output |

An improved approach—and one that avoids leaving an unwelcome inheritance to future generations—is to process carbon dioxide and other greenhouse gasses into solid carbons, thus completely avoiding the problems associated with traditional carbon dioxide capture and storage techniques.

Disclosed herein are highly innovative approaches for high-efficiency solid carbon capture. The various approaches can be applied in a manner that completely eliminates polluting emissions that are a byproduct of fossil fuel combustion. The technique can capture and remove carbon from exhaust streams of any fossil fuel processes such as are operated by, for instance, coal-fired or natural gas-fired electricity generation utilities and other big greenhouse gas producers.

As hereinabove indicated, a processing reactor receives an effluent exhaust gas stream (e.g., from a coal-fired or natural gas-fired electricity generation facility). The effluent exhaust gas stream is directed through a high frequency, atmospheric pressure, non-equilibrium plasma to break apart target molecules such as carbon dioxide, carbon monoxide, and unspent hydrocarbons. Additional details regarding general approaches to maintaining a non-equilibrium plasma can be found in U.S. Pat. No. 11,107,662, filed Sep. 30, 2020, and entitled "Reactor System Coupled to an Energy Emitter Control Circuit," the contents of which are herein incorporated by reference.

The elements released from these cracked molecules are then controlled by an electromotive force to maintain separation, modulate ion lifetimes, and allow for recombination of oxygen, nitrogen, and hydrogen atoms into $O_2$, $N_2$, and $H_2O$. These benign (or in the case of oxygen, beneficial) resultant gases can then be released into the surrounding environment or used for other purposes.

The solid carbons are formed in a plasma. The plasma is generated by combining a specific arrangement of active electrodes with energy-optimized electromagnetic radiation and high intensity electric fields. Formed on the active electrodes are arrangements wrapped around the gas stream to precisely create the necessary frequencies and energy levels for breaking apart the molecules. Efficiency is partially dependent on the precision with which the electrodes are arranged in the reactor and on the type and magnitude of energy supplied to the system. Control of these variables dominates the morphology of the carbons produced (e.g., graphene, carbon nano-onions, mixed phase graphenes, etc.).

These non-polluting solid carbon capture processes provide a highly efficient means for elemental carbon removal from electricity generation plant exhaust streams while only using an estimated 10-15% of the electricity generated by that plant. Moreover, by incorporating the captured carbon into these solids, subsequent release into the atmosphere is extremely unlikely, particularly less so than when employing conventional carbon sequestration techniques. Accordingly, the presently disclosed inventive concepts represent a revolutionary approach to CCS, while also providing economically useful by-products.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various aspects are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed aspects—they are not representative of an exhaustive treatment of all possible aspects, and they are not intended to impute any limitation as to the scope of the claims. In addition, an illustrated aspect need not portray all aspects or advantages of usage in any particular environment.

An aspect or an advantage described in conjunction with a particular aspect is not necessarily limited to that aspect and can be practiced in any other aspects even if not so illustrated. References throughout this specification to "some aspects" or "other aspects" refer to a particular feature, structure, material or characteristic described in connection with the aspects as being included in at least one aspect. Thus, the appearance of the phrases "in some aspects" or "in other aspects" in various places throughout this specification are not necessarily referring to the same aspect or aspects. The disclosed aspects are not intended to be limiting of the claims.

Descriptions of Exemplary Aspects of the Invention

According to one aspect, a method for producing solid carbon from carbon dioxide gas and water includes: receiving carbon dioxide and water in a reactor configured to generate a plasma; dissociating the carbon dioxide and the water using the plasma to form one or more dissociated species; exposing the dissociated species to an electric field configured to facilitate one or more chemical reactions;

generating solid carbon via the chemical reactions; and outputting the solid carbon from the reactor.

According to another general aspect, a system includes: a waveguide comprising a plasma zone extending along a length of the first waveguide; a microwave energy source coupled to the waveguide; a first flow inlet configured to flow carbon dioxide gas into the plasma zone; and a gas-solid separator system coupled to the microwave plasma reactor. The microwave energy source is configured to propagate microwave energy into the waveguide. The microwave energy is configured to generate a plasma within the plasma zone. The plasma within the plasma zone is configured to dissociate the carbon dioxide gas into a plurality of components including oxygen gas and solid carbon particles. The gas-solid separator (GSS) system is configured to receive the plurality of components.

According to yet another general aspect, a system includes: a plurality of reaction chambers, wherein each reaction chamber is coupled, directly or indirectly, to at least one microwave energy source, at least one amplifier, and at least one receptacle. Each reaction chamber comprises a waveguide coupled to the microwave energy source. Each waveguide respectively includes a plasma zone configured to generate a plasma in response to the microwave energy; at least one inlet configured to deliver raw material into the plasma zone; and an outlet configured to output a powder based on the raw material.

According to still yet another general aspect, a composition of matter includes a carbonaceous material having physical characteristics of being formed from dissociation of carbon dioxide and water using a plasma and an electric field.

To illustrate, FIG. 1 depicts an exemplary negative emission reactor (CARBON CAPTURE REACTOR, or simply "REACTOR") coupled to a fossil fuel power generation facility (POWER GENERATION FACILITY, or "FACILITY"), in accordance with one aspect. The REACTOR is configured to capture carbon produced in the FACILITY, and convert the captured carbon into useful solid by-products. FOSSIL FUEL is fed into the FACILITY, where a combustion reaction (COMBUSTION) produces, among other products, carbon dioxide ($CO_2$) and water vapor (STEAM). Energy (POWER) generated via this combustion reaction is provided to the electric grid (GRID) for consumption.

These products are fed directly into the REACTOR, and exposed to one or more plasmas (not shown) that are tuned/controlled in order to produce desired solid carbon by products (SOLID CARBON), such as graphene (GRAPHENE), three-dimensional carbon structures (3D CARBON), and/or more conventional carbon based materials (CONVENTIONAL MATERIALS) suitable for, e.g., incorporation into building materials, tires, etc. as would be understood by a person having ordinary skill in the art upon reading the present disclosure.

Meanwhile, other by-products of the reaction(s) performed in the REACTOR include molecular oxygen and/or nitrogen, according to one various aspects and generally depending on the type of input provided to/combusted in the FACILITY. Preferably, at least some of the oxygen ($O_2$) produced is released into the BIOSPHERE, providing additional environmental benefits beyond mere capture of carbon from the FOSSIL FUEL. Optionally, oxygen produced in the REACTOR may be returned to the FACILITY to help drive combustion of further fuel.

FACILITY and REACTOR each preferably include a cap or other mechanism for preventing emissions from escaping. In this manner, aside from beneficial oxygen release (and/or release of benign products such as molecular nitrogen), the REACTOR enables power generation with zero emissions. By capturing carbon in more-or-less permanent form via the solid carbon products, overall emissions from generating power according to an arrangement as shown in FIG. 1 are negative. Carbon is removed from the atmosphere and incorporated into products that will not result in subsequent release into the atmosphere.

As will be appreciated by persons having ordinary skill in the art, generating solid carbon, and especially particular desired species of carbon products, requires much more than simply exposing carbon dioxide to plasma. As indicated previously, the plasma is controlled and tuned to yield specific conditions necessary for efficiently converting carbon dioxide gas into solid carbon, according to a two-reaction scheme described in greater detail hereinbelow with reference to FIGS. 3A-3B.

Figure 2:
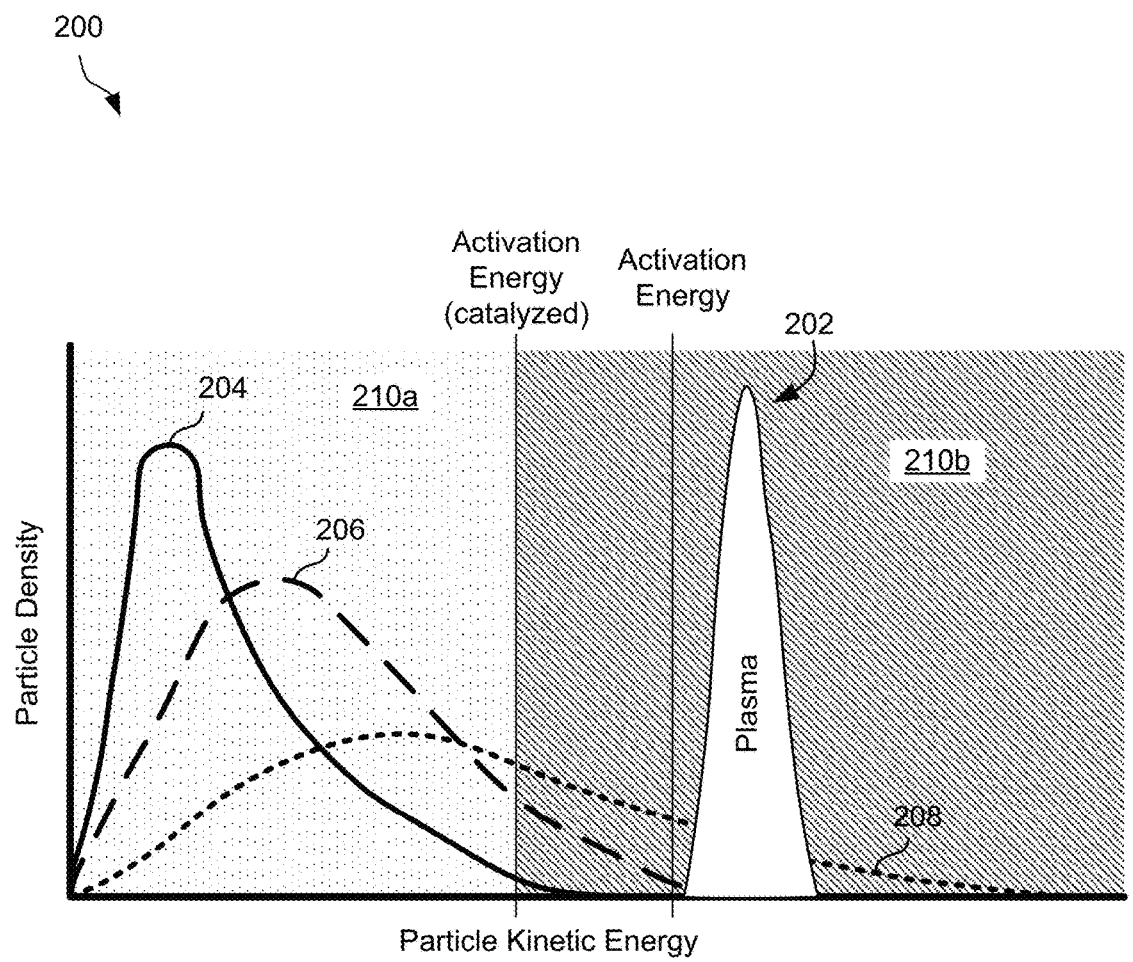
FIG. 2 illustrates a plot demonstrating activation energy barriers to participation in conversion reaction chemistry, both using thermal catalysis and plasma catalysis, in accordance with one aspect.

FIG. 2 is an efficiency comparison chart 200 showing that an extremely high population of conversion reactions occur when the reactions take place in a plasma reactor, according to an aspect. Specifically, FIG. 2 shows typical Maxwell-Boltzmann distributions at several temperatures showing the particle density probability versus kinetic energy (KE). The plasma-based energy excitation system curve 202 has been added showing the distribution for an energy optimized plasma-based energy excitation system.

To appreciate the impact of the plasma energy curve 202, consider the well-known Bosch reaction (shown in Eq. 1 and Eq. 2). The Bosch reaction is a chemical reaction between carbon dioxide and hydrogen that produces elemental carbon (graphite), water, and a 10% return of invested heat. The Bosch reaction requires the introduction of a catalyst and requires a temperature level of 530-730° Celsius. The first reaction, known as water shift-gas reaction (Eq. 1), is very fast while the second reaction (Eq. 2) is slow and is, therefore, the controlling reaction:

$$CO_2+H_2 \rightarrow CO+H_2O \qquad \text{Eq. 1}$$

$$CO+H_2 \rightarrow C+H_2O \qquad \text{Eq. 2}$$

Systems that carry out the foregoing chemical reactions have been used to remove carbon dioxide from the atmosphere of space capsules. One such system exploits a high temperature (600° Celsius) catalytic reaction to convert carbon dioxide into elemental carbon dust and water. Such a system can be very effective with respect to removal of carbon dioxide from the atmosphere, however such systems suffer two critical deficiencies: (1) carrying out the second reaction in which the elemental carbon is extracted from the carbon monoxide causes fouling of the catalytic surfaces by forming a solid-solid solution, which is the result of the metallurgical reaction in which the carbon atoms dissolve in the metal catalyst, thus resulting in a severely limited operational lifetime of the system; and (2) causing and controlling the foregoing chemical reactions is very inefficient from an energy cost perspective.

Plasma-based techniques address both deficiencies, specifically: (1) when using plasma-based techniques, there is no need for catalysts, and as such, there is no fouling of the catalytic surfaces; and (2) the energy efficiency of the process is much higher when using the herein-disclosed techniques.

To further explain this latter point, the energy efficiency in the conversion of carbon dioxide into elemental carbon is directly tied to the reaction rates of the necessary chemical pathways. To understand where major efficiency loss mechanisms exist in a thermal, catalytic thermal, and plasma catalytic-based systems, the energetic particle densities and their associated energies for each system must be examined.

As shown in FIG. 2, the required activation energy for particles to participate in any chemical reaction to occur is represented as the area under the curves to the right of the line depicting activation energy. As is shown the number of particles actively taking part in reaction chemistry at 0 Deg C. (line 204) is zero. Line 206 (at 1000 Deg C.) shows that the number of particles participating is still very low. At 2000 Deg C. (line 208) significantly more reactants are at energy for reactions to take place however the total number is still relatively small. Indeed, in region 210a, no conversion reactions take place, and in region 210b, only particles under the curves defined by lines 206 and 208 play a role in conversion reaction chemistry, when using thermal energy.

As the plot of FIG. 2 shows, the addition of a catalyst shifts the required activation energy to lesser values (denoted by a leftward movement of the dashed line), allowing more particles to participate in the reaction process. However, the number of available energetic particles remains small. If the temperatures were to be elevated to extremely high levels (e.g., just short of melting the catalyst and components of the system), even more particles would be able to participate; however, adverse reaction pathways could arise at these temperatures and system and energy cost per particle would not be practical. Since there is an energy cost per particle, the more particles that are available for reaction per unit of power input, the more efficient the system will be with respect to conversion of materials.

Now, referring to the plasma catalysis curve 202, virtually all particles actively participate in the chemical reaction process, providing a much more efficient process. Notably, using plasma catalysis enables approximately all of the particles to participate in conversion chemistry, ultimately producing solid carbon. In addition, plasma catalysis does not require the use of a separate catalyst to lower the activation energy, avoiding contamination and consumption problems associated therewith.

Figure 3A:
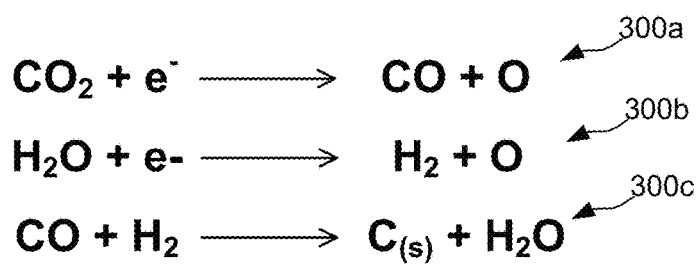
FIGS. 3A-3B illustrates chemical dissociation and recombination pathways for converting carbon dioxide to solid carbon, oxygen, and water, in accordance with one aspect.
Figure 3B:
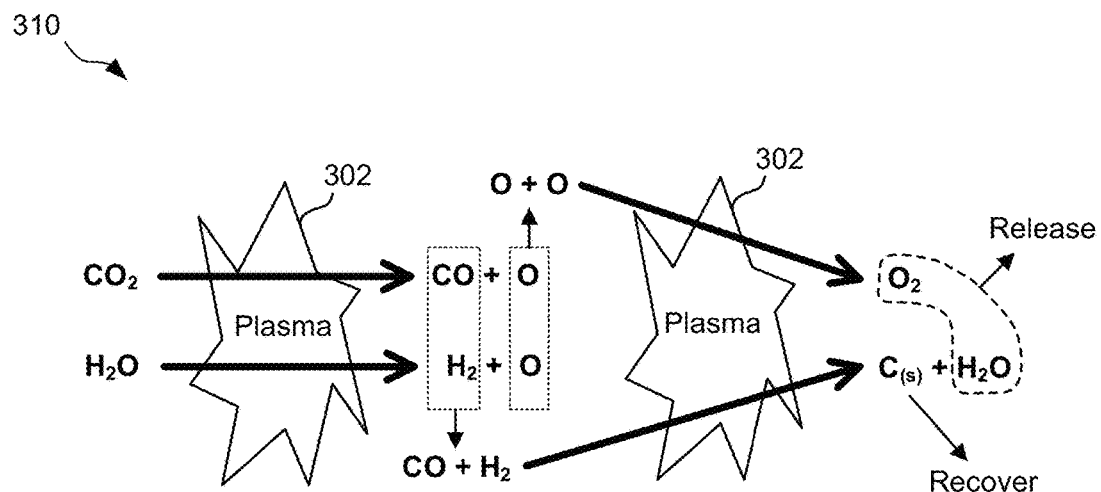

One possible pathway is shown and discussed as pertains to FIGS. 3A-3B. In particular, FIG. 3A depicts chemical dissociation and recombination pathways 300a, 300b, and 300c that are facilitated after molecular dissociation in a plasma reactor, according to an aspect. FIG. 3B illustrates the same pathways 300a, 300b, and 300c in a single graphical scheme 310.

As shown, this scheme operates by directing an exhaust gas stream through a high-frequency atmospheric pressure non-equilibrium plasma to break apart pollutant molecules (e.g., silanes, siloxanes, polysiloxanes, cadmium oxides, $NO_x$, $SO_x$, $CO_x$, hydrocarbons, etc. as would be understood by a person having ordinary skill in the art upon reading the present disclosure). The elements released from these dissociated molecules are then controlled by an electromotive force to maintain separation of the dissociated constituents and to facilitate disposition (e.g., collection or release) of the resultant substances. As shown, free oxygen and hydrogen atoms are permitted to recombine into $O_2$, and $H_2O$, and are released into the air. (Those having ordinary skill in the art will appreciate other products, such as molecular nitrogen, may be produced when other pollutant molecules are present.) Other elements (primarily carbon, but also including sulfur, silicon, etc. according to some approaches) are captured as solids, and then collected for industrial and manufacturing uses such as heretofore discussed.

Referring again to FIG. 3B, the plasma 302 is generated by combining a specific arrangement of active thin-film electrodes on a flexible substrate with energy-optimized electromagnetic radiation and electric fields. This flexible material wraps around the gas stream and precisely creates the necessary frequencies and energy levels for breaking the molecules. Efficiency is at least partially dependent on the precision with which the electrodes are arranged on the substrate and on the energies applied to the system.

In addition, it is preferable to remove oxygen from the system quickly, so as to avoid recombination and improve overall conversion efficiency.

An important aspect of FIGS. 3A-3B, which is discussed further hereinbelow with respect to efficiency of converting carbon dioxide into solid carbon, is that the direct dissociation of carbon dioxide into solid carbon requires very large input energy (e.g. approximately 28 eV), and yet still is very inefficient (e.g. approximately 8.6% conversion). Accordingly, merely employing a plasma such as capable of being generated by a microwave reactor as disclosed herein will not yield the desired conversion rates and consequent generation of solid carbon.

To address this shortcoming, the presently described inventive concepts leverage water (and various dissociated species thereof) to provide additional dissociation pathways and chemical reaction pathways to convert carbon dioxide (and various dissociated species thereof) into solid carbon. While FIGS. 3A-3G depict several such exemplary pathways, it shall be understood that these are provided for illustrative purposes, and should not be considered limiting on the scope of the inventive concepts described herein. Any additional and/or alternative pathway(s) that would be appreciated as suitable by a person having ordinary skill in the art upon reading this disclosure may be implemented without departing from the scope of the invention.

Figure 3C:
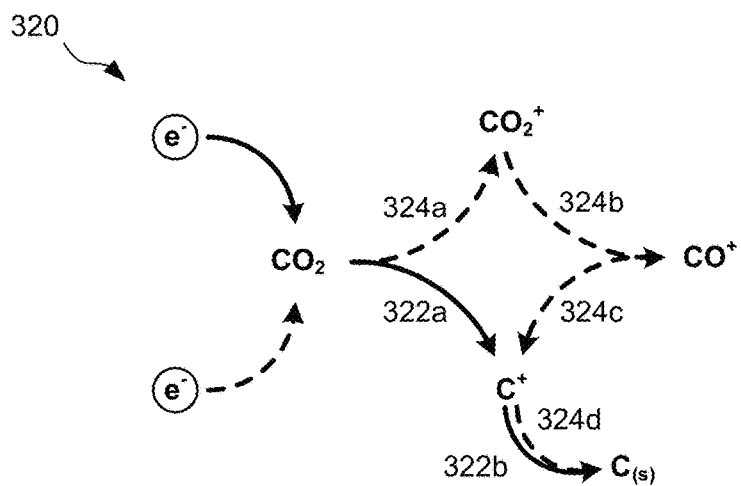
FIG. 3C depicts a multiple reaction pathway chart showing how a single electron can participate in multiple conversion reactions, according to one aspect.

FIG. 3C is a multiple reaction pathway chart 320 showing how a single electron can participate in multiple reactions when the energies are tuned for efficient solid carbon capture. Specifically, and as shown, a single electron with high enough energy can participate in multiple reactions.

FIG. 3C considers pathways in a plasma reactor system that utilizes highly energetic electrons as the igniter for plasma phase chemistry. The plasma phase reaction chemistry and resultant products can be tuned, based on the dissociation cross-section ratios. Various electron impact dissociation experiments have been performed for carbon dioxide, water, nitrogen, and many more species.

FIG. 3C depicts two possible reaction pathways to convert CO2 into solid carbon ($C_{(s)}$). In the first reaction pathway, denoted by solid lines, an electron $e^-$ directly converts $CO_2$ into $C^+$ ions in step 322a, which are subsequently reduced into solid carbon in step 322b. This direct pathway, however, is highly inefficient and only converts approximately 8-10% (e.g., ~8.6%) of the $CO_2$ into $C^+$, according to experimental results. Moreover, this conversion requires approximately 27.8 electron volts of input energy (or equivalently, kinetic energy of about 280,000 degrees Kelvin).

Accordingly, the presently disclosed inventive concepts take advantage of a second reaction pathway, denoted by the dashed lines in FIG. 3C. According to this pathway, an electron $e^-$ first dissociates $CO_2$, forming $CO_2^+$ in step 324a, which subsequently converts into dissociated carbon monoxide ($CO^+$) in step 324b. The dissociated carbon monoxide is subsequently converted into dissociated carbon in step 324c, which is ultimately reduced to form solid carbon in step 324d.

If the impacting electron has energy greater than the activation energy, the surplus energy will be scattered or re-radiated as electrons. These secondary electrons might have sufficient energy to cause further reactions within the plasma chemistry system such that one electron of sufficiently high energy could result in the dissociation of many states. For example, one 100 eV electron could take part in a three-step dissociation process to produce $C^+$, as shown in the second reaction pathway of FIG. 3C. Alternatively, the electron could take part in the single step direct dissociation of $CO_2$ to $C^+$, as shown in the first reaction pathway of FIG. 3C. In the latter case, surplus energy can be utilized elsewhere in the reactor system. For carbon reduction and removal from a system containing carbon dioxide, water, and nitrogen (such as is found in a fossil fuel plant exhaust), several pathways exist at different electron energies. Additional details regarding pathways implemented in the context of the presently disclosed inventive concepts are presented herein with reference to FIGS. 3E-3G.

As will be appreciated by persons having ordinary skill in the art upon reading the present disclosure, these reaction pathways (particularly the second reaction pathway) requires input energy on a scale that prohibits use of thermal energy sources to achieve the desired dissociation states and corresponding conversion of $CO_2$ into solid carbon at desired efficiency (e.g., conversion efficiency up to about 85%, up to about 90%, up to about 95%, up to about 98%, up to about 99%, or up to about 100%, according to various aspects).

Accordingly, the presently disclosed inventive concepts employ ultra high frequency energy sources, such as one or more magnetron(s), one or more klystron(s), or any other suitable source for generating ultra high frequency radiation (preferably microwave radiation) sufficient to generate a plasma, most preferably a plasma characterized by an energy of approximately 100 electron volts (eV) (which requires about 1 gigawatt of input energy), and/or a frequency in a range from about one gigahertz to about five gigahertz, in various aspects. Preferably, the energy sources (and/or corresponding reactors) are configured so that energy output can be accumulated from among a plurality of sources/reactors chained together, e.g., so as to facilitate amplification and/or multiplexing of power generated by the series.

For instance, again considering a plasma characterized by an energy of approximately 100 eV, in various aspects suitable energy sources may include 100 one-megawatt reactors, 50 two-megawatt reactors, 25 four-megawatt reactors, or any other suitable combination of reactors connected together so as to output a total of 1 gigawatt energy to drive the plasma. In preferred aspects, the reactors may include LYTEN® klystron reactors. Of course, in alternative aspects, different energy output requirements may be met using different combinations and types of reactors, as would be appreciated by a person having ordinary skill in the art upon reading the present disclosure.

Additional details regarding suitable energy source configurations (or equivalently, "reactors") are provided herein with reference to FIGS. 4-7B. Similarly, additional details regarding dissociation of carbon dioxide into various species, and regarding dissociation of water to facilitate the second reaction pathway shown in FIG. 3C, are discussed herein with reference to FIGS. 3E-3G.

Figure 3D:
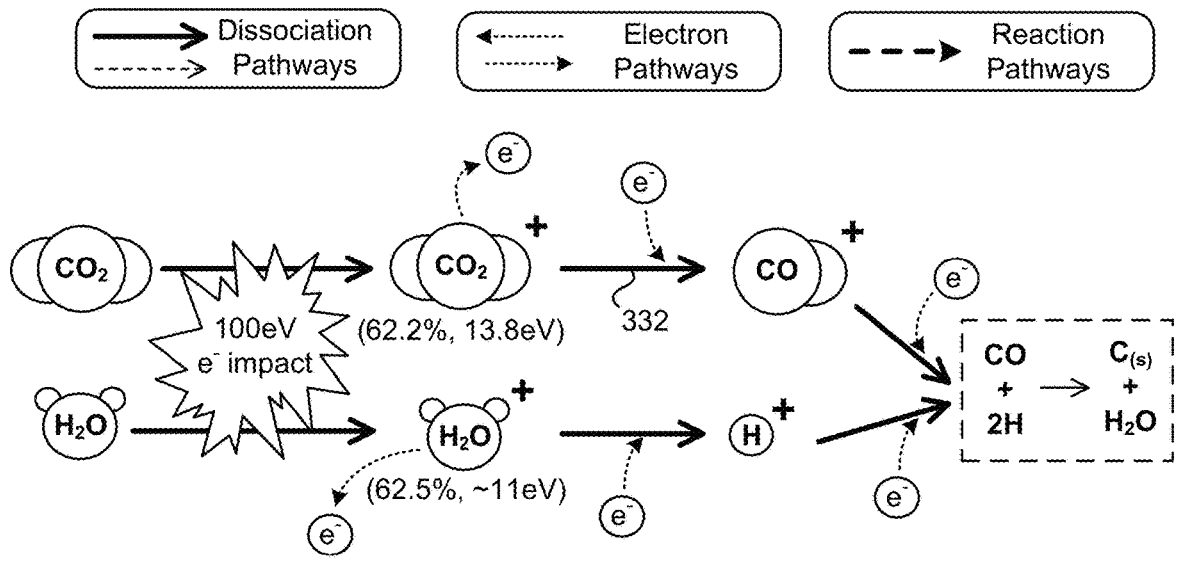
FIG. 3D shows exemplary dissociation pathways for generating solid carbon from carbon dioxide and water, according to one aspect.

FIG. 3D shows exemplary dissociation pathways for generating solid carbon from carbon dioxide and water, according to one aspect.

As shown in FIG. 3D, in addition to the direct dissociation pathway, there are many multistep dissociation pathways of carbon dioxide and water that lead to the formation of oxygen gas and carbon solid (graphite, diamond, etc.). The most probable dissociation state of carbon dioxide (i.e., as defined by the largest dissociation cross-section), is that of $CO_2^+$. This dissociation state, if impacted by an energetic electron, is able to further dissociate into $C^+$, $O^+$, $CO^+$, $C^{++}$, or $O^{++}$. However, the doubly charged dissociation states are extremely less likely due to the very small dissociation cross-section. The carbon monoxide dissociation state also has electron impact dissociation pathways for carbon solid formation. More importantly, though, there are chemical pathways in the presence of dissociated water (and therefore hydrogen) that provide thermodynamically favorable pathways to carbon solid formation. Shown in FIG. 3D is one possible pathway to carbon solid formation via the reaction 332 between dissociated carbon monoxide and hydrogen, resulting in carbon solid and water. This reaction, however, depends upon the presence of hydrogen in the system. In terms of both economic costs and energy expenditures, it is best to generate the hydrogen from water vapor contained within the exhaust.

Accordingly, FIG. 3D illustrates the impact of leveraging electron energy to convert carbon dioxide into solid carbon. As noted previously, utilizing water in addition to high-energy plasma drastically increases the conversion efficiency while also lowering the requisite activation energy (note in FIG. 3D, conversion efficiency is increased to 62.2%, while activation energy is lowered to approximately 14 eV). By controlling the chemical reaction pathways through energy control, optimal chemical reactions to precipitate out carbon are achieved, according to preferred aspects. The precise control afforded by microwave plasmas, particularly when combined with an AC and/or (preferably pulsed) DC field(s) as described in greater detail hereinbelow, makes these energy sources particularly preferred for optimal performance. Further details regarding general approaches for controlling plasma energies can be found in U.S. Pat. No. 9,812,295, filed Nov. 14, 2016 and entitled "Microwave Chemical Processing," the contents of which are herein incorporated by reference.

Figure 3E:
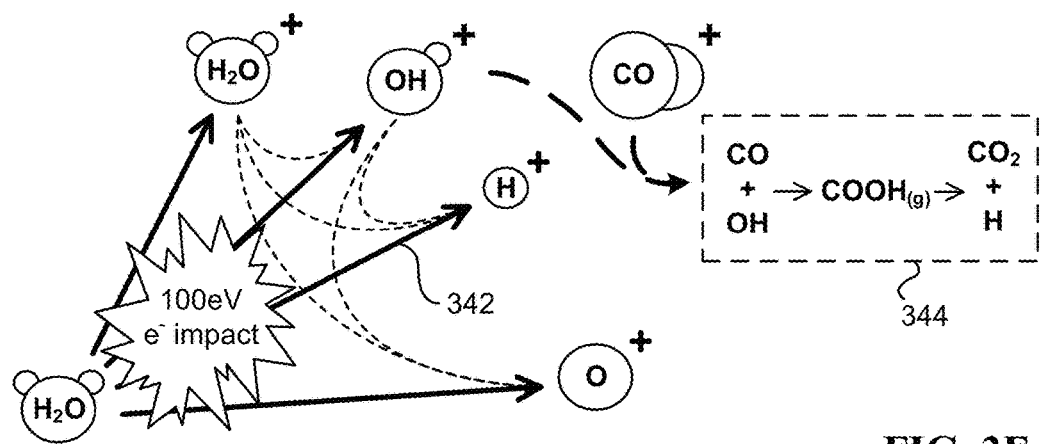
FIG. 3E depicts various dissociation states generated, and associated dissociation cross sections, when exposing water to a plasma, according to one aspect.

FIG. 3E depicts various dissociation states generated, and associated dissociation cross sections, when exposing water to a plasma, according to one aspect. More specifically, FIG. 3E depicts a water reaction pathway sequence when the reactions are performed in a plasma reactor.

From inspection of FIG. 3E, it will become apparent that dissociation of water may result in various dissociated species, including direct formation of $H_2O^+$ (with a corresponding dissociation cross section of 62.5%), $OH^+$ (dissociation cross section 19.9%), $H^+$ (having an dissociation cross section of 17.2%), and $O^+$ (dissociation cross section 0.33%). Moreover, as indicated by the dashed lines, these species may further recombine, e.g., $H_2O^+$ maybe converted into $OH^+$, $H^+$, and/or $O^+$, in various aspects; $OH^+$ may recombine into $H^+$ and/or $O^+$, in further aspects, contributing to the overall dissociation cross section for each species.

With continuing reference to FIG. 3E, pathway 342 leads to the direct formation of hydrogen ions, which are useful for subsequent reduction of carbon monoxide. Several other multiple step dissociation pathways to hydrogen generation exist, as well as a thermodynamic pathway via reaction between carbon monoxide, and hydroxide ions, to form $COOH_{(g)}$; thermal decomposition of which regenerates carbon dioxide and hydrogen as shown in pathway 344.

Figure 3F:
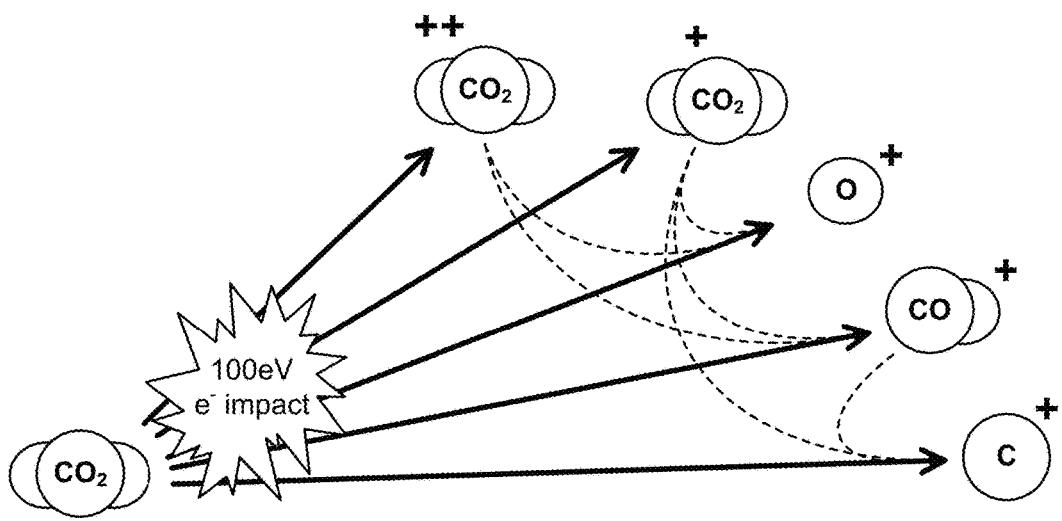
FIG. 3F depicts various dissociation states generated, and associated dissociation cross sections, when exposing carbon dioxide to a plasma, according to one aspect.

FIG. 3F depicts various dissociation states generated, and associated dissociation cross sections, when exposing carbon dioxide to a plasma, according to one aspect. More specifically, FIG. 3F depicts a carbon dioxide reaction pathway sequence when the reactions are performed in a plasma reactor.

From inspection of FIG. 3F, it will become apparent that dissociation of water carbon dioxide may result in various dissociated species, including direct formation of $CO_2^{++}$ (with a corresponding dissociation cross section of 0.7%), $CO_2^+$ (dissociation cross section 62.2%), $O^+$ (having an dissociation cross section of 17.7%), $CO^+$ (dissociation cross section 10.8%), and $C^+$ (dissociation cross section 8.6%). Moreover, as indicated by the dashed lines, these species may further recombine, e.g., $CO_2^{++}$ maybe converted into $CO^+$, and/or $O^+$, in various aspects; $CO_2^+$ may recombine into $O^+$, $CO^+$ and/or $C^+$, in further aspects; and $CO^+$ may generate $C^+$, contributing to the overall dissociation cross section for each species.

The above dissociation species' cross-sectional areas are a percentage of the total cross-sectional area versus impacting electron energy for carbon dioxide. Specifically, if an electron at 50 eV impacts a $CO_2$ molecule, there is a 62.2% probability that $CO_2^+$ would be created. Moreover, these dissociation states have a necessary activation energy which needs to be overcome. In the case of $CO_2^+$ this required energy is 13.8 eV, again assuming presence/use of water to facilitate the various dissociation and conversion pathways.

Figure 3G:
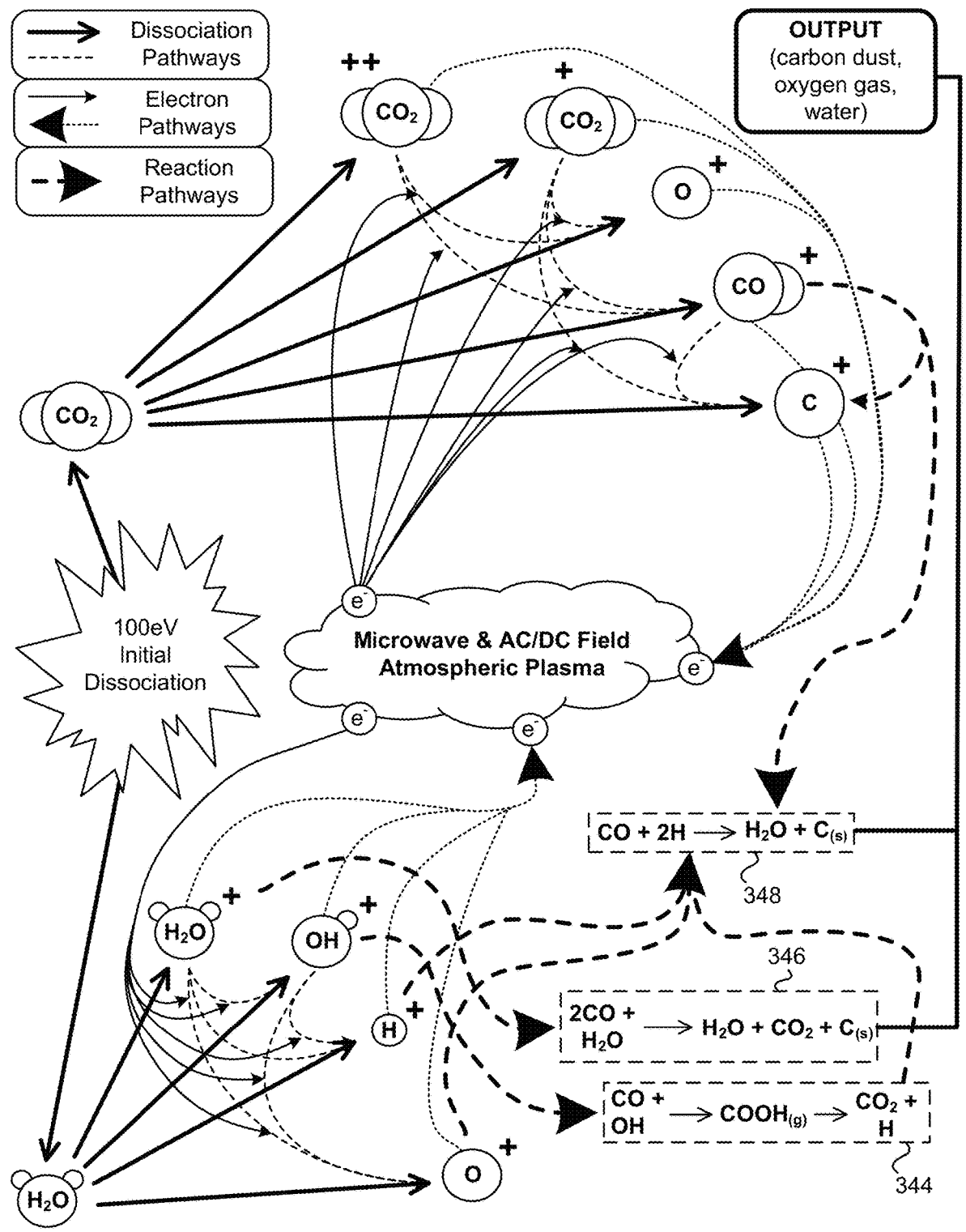
FIG. 3G is a reaction chart showing dissociation and electron pathways for combined dissociation of carbon dioxide, water, and nitrogen when exposing a gas mixture thereof to plasma, according to one aspect.

FIG. 3G is a reaction chart showing dissociation pathways, electron pathways, and chemical reaction pathways for combined dissociation of carbon dioxide, water, and nitrogen when exposing a gas mixture thereof to plasma, according to one aspect. Though not shown in FIG. 3G, the initial dissociation process may, in some aspects, also generate nitrogen ions ($N^+$) from molecular $N_2$ present in the ambient atmosphere (e.g., within the reactor). These nitrogen ions may impact $CO_2$ and/or $H_2O$, facilitation dissociation thereof into the various species shown, in various aspects.

In addition to the dissociation pathways (thick, solid black lines) shown in FIGS. 3E and 3F, FIG. 3G depicts how electrons (e)flow from the Microwave and Alternating Current (AC) Field Atmospheric Plasma and participate in the dissociation pathways (thin solid lines, small arrowheads) as well as how electrons are released in the process of such dissociation pathways (thin dotted lines, large arrowheads).

Further still, FIG. 3G depicts chemical reaction pathways (thick dashed lines, large arrowheads) for certain dissociated species to participate in and form various outputs of the reactor, including solid carbon ($C_{(s)}$), oxygen gas, and water. More specifically, per reaction 344, carbon monoxide and dissociated hydroxyl ($OH^+$) may react to form $COOH_{(g)}$, which as noted above regarding FIG. 3E thermally decomposes into carbon dioxide and hydrogen. The hydrogen subsequently may be used for reduction of carbon monoxide to form water and solid carbon, e.g., as shown in reaction 348. Accordingly, reactions 346 and 348 represent a two-step pathway to synthesis of solid carbon from carbon dioxide gas, using water. Similarly, dissociated water may react with carbon monoxide in reaction 346 to directly form water, carbon dioxide, and solid carbon in a single step.

As discussed in greater detail herein, controlling the conditions of the plasma allows control over the specific dissociated species, and corresponding chemical reactions, that take place. Also disclosed herein are systems and techniques to tune the plasma energy distribution for optimum reaction pathways to be achieved. It shall be understood that the various features, components, and arrangements shown in FIGS. 4-7B and discussed hereinbelow may be combined in any suitable manner that would be appreciated by a person having ordinary skill in the art upon reading the present disclosure and viewing the various drawings. In other words, while FIGS. 4-7B show several exemplary aspects of systems, and various components thereof, suitable for tuning plasma energy distribution(s) to achieve optimum reaction pathways, these aspects are provided solely for illustrative purposes, and the various components thereof are to be considered modular in nature.

As will be appreciated by persons having ordinary skill in the art upon reading the present disclosure, certain tuning parameters depend from the input energy of the electrons. As one tuning example, the input energy of the electrons can derive from the nature (e.g., shape, duty cycle, etc.) of the pulsed power (e.g., AC and/or DC field(s)) in conjunction with the frequency, phase and propagation mode of the microwave radiation. Thus, reaction sequences are tunable, which tunability provides the means for efficient, low cost carbon removal.

Figure 4:
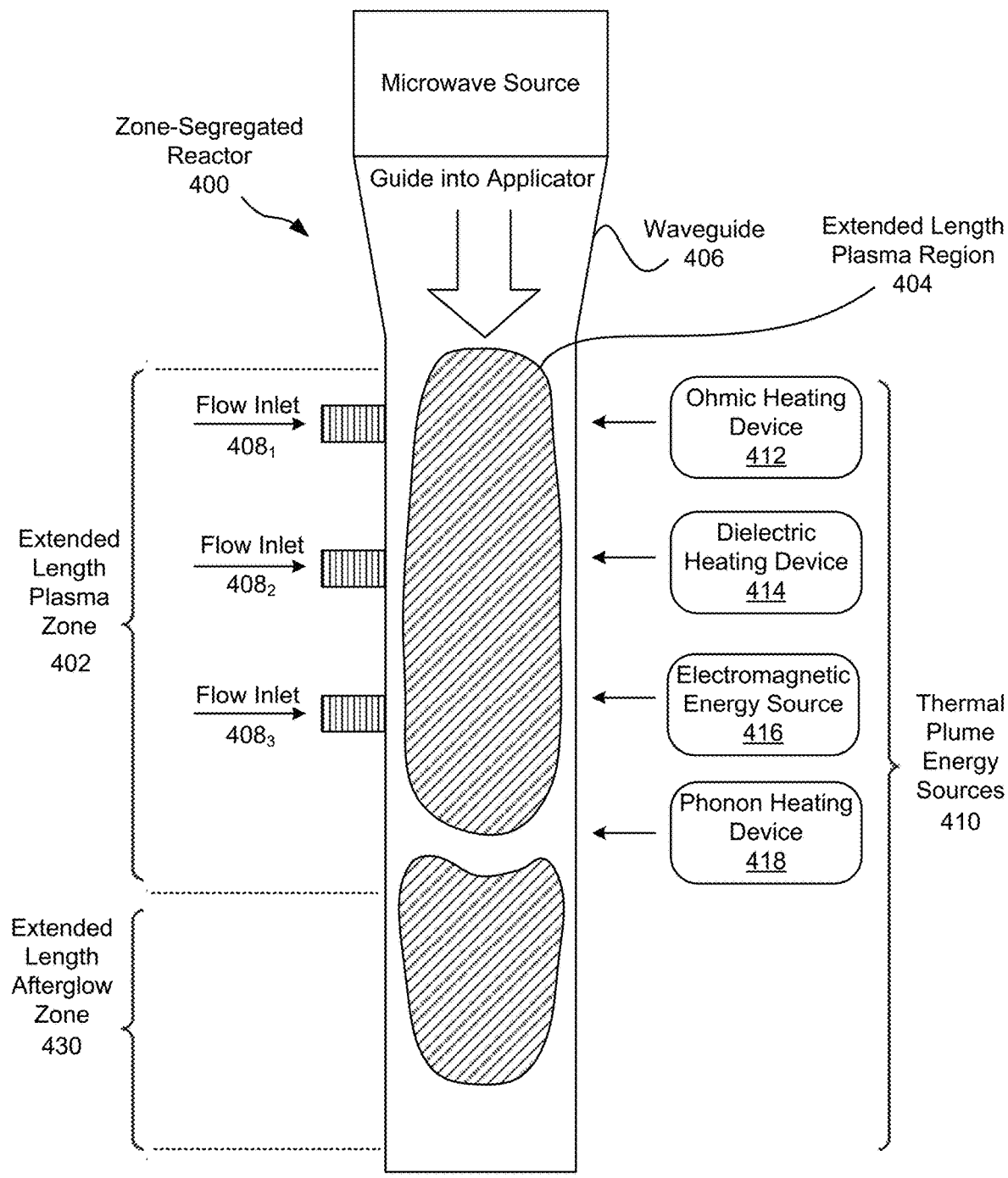
FIG. 4 illustrates a simplified vertical cross-section of a microwave gas processing system including a zone-segregated reactor, in accordance with one aspect.

For instance, and referring to FIG. 4, a simplified vertical cross-section of a microwave gas processing system including a zone-segregated reactor 400 having an extended length plasma zone 402 is shown, according to one aspect. In operation, a waveguide 406 guides microwave energy from a Microwave Source into a reaction zone including the extended length plasma zone 402 and an extended length afterglow zone 430 (also referred to herein as a "reaction zone").

In addition, the extended length plasma region 404 may be controlled so as to facilitate fine-tuned control of radical generation and/or to facilitate introduction of additional materials. Specifically, and as shown, a first set of thermal plume energy sources 410 (such as ohmic heating device 412, dielectric heating device 414, phonon heating device 418) are positioned along the length of extended length plasma zone 402, whereas a second set of thermal plume energy sources 1023 (such as electromagnetic energy source 416, and/or an optional light energy source (not shown)) are positioned along the length of the extended length afterglow zone 430. Though not shown in FIG. 4, the extended length plasma zone 402 and/or extended length afterglow zone 430 may be coupled to a voltage generator configured to generate an alternating current (AC) field and/or a pulsed direct current (DC) field, which allows precise control over temperatures in the corresponding zone(s).

As shown, the length of extended length plasma zone 402 is sufficiently long so as to accommodate a three flow inlets $408_1$, $408_2$, and $408_3$ to provide material to the reactor 400.

In use, according to preferred aspects, flow inlets $408_1$ and $408_2$ may provide materials such as water and carbon dioxide to the reactor 400. Of course, additional or different materials may be provided via flow inlets $408_1$ and $408_2$ without departing from the scope of the presently disclosed inventive concepts.

According to still more aspects, third flow inlet $408_3$ can be configured to provide additional material into a FEWG, such as FEWG 505 shown in FIG. 5 and discussed in greater detail hereinbelow. For example, to functionalize the graphene surface with different chemical groups such as fluorine, oxygen, or nitrogen these precursors can be added into third flow inlet as a gas stream. Growing composite particles can also be achieved in this fashion. For example, growing a composite SiC surface on top of the graphene nanoplatelets can be achieved by adding $SiH_4$ into the foregoing gas stream (such as via the third flow inlet).

The thermal plume energy sources 410 may be modular such that the various thermal plume energy sources can be positioned in any location along the FEWG. For example, the ohmic heating device 402 can be swapped with electromagnetic energy source 416. Moreover, such modularity can include signaling to/from one or more reactor controllers. One example of such a configuration is described hereinbelow.

Energy sources (such as ohmic heating device 412, dielectric heating device 404, electromagnetic energy source 416, phonon heating device 418, and/or an optional light energy source (not shown)) are coupled to a pan-reactor temperature and flow controller (not shown). The flow controller is in turn coupled with a bank of pan-reactor flow actuators coupled to flow inlets $408_1$, $408_2$, and $408_3$. Moreover, a series of temperature measurements are coupled to the pan-reactor temperature and flow controller and can control any one or more of the energy sources based at least in part on the temperature measurements. As such, temperatures within the reactor can be controlled to a fine degree across all zones, and within all regions of the reactor. Moreover, pulsing of the plasma field, e.g., by modulating parameters including the duty cycle and frequency, allows precise control of the plasma field.

According to additional aspects, a reactor such as reactor 400 enables atmospheric pressure plasma reduction chemistry facilitated using microwave radiation to generate pathways towards the energy efficient and low-cost removal of carbon from carbon dioxide. The formed carbon solids can be collected at various points of the reactor. The shown reactor (which may include an applicator such as waveguide 406 shown in FIG. 4, and may include or encompass various thermal plume energy sources 410, in preferred aspects) can be scaled and configured to accommodate various gas mixtures that correlate to the exhaust from a fossil fuel power plant. More specifically, the plasma energies and thus chemical reaction kinetics are tuned to specifically target certain plasma reaction sequences such that efficient carbon solid and oxygen gas formation and separation will occur from the mixture of carbon dioxide and other gasses in the exhaust of a fossil fuel power plant thereby reducing or completely eliminating the so called "carbon footprint" of the fossil fuel power plant.

Accordingly, FIG. 4 depicts several components of a zone-segregated reactor 400. The shown reactor is a complex dual surface wave plasma system tailored for graded thermal output which yields nucleation and growth of graphene nano platelets of few layer graphene. The reactor volume gas and particle resonance times allow for the re-nucleation and growth off of other grown platelets which leads to a complex clustering of covalently bonded carbon-to-carbon connected nano platelets. In this and other aspects, such a zone-segregated reactor 400 can be tuned for plate size, plate spacing, lattice spacing, as well as for pore volume and pore size. Strictly as tuning and control examples, the microwave source can be power-controlled and pulsed so as to facilitate nucleation and growth aspects that result in formation of nano platelets of a particular plate size, plate spacing, lattice spacing, pore volume, pore size, etc. Moreover, and as shown, the plasma plume column length can be tuned for length, with or without additional energy being provided by heat-producing devices (e.g., an ohmic heating device 412, a dielectric heating device 414, etc.).

In some aspects, the plasma plume may be extended such as is shown by the thermal afterglow that extends substantially through the shown extended length of the reactor 400. The extended length may be long enough, and the flow rate through extended length may be controlled so as to facilitate particle resonance times that allow for the re-nucleation and growth off of other grown platelets. Various energy sources (e.g., phonon heating device 418, electromagnetic energy source 416, optional light energy source (not shown), etc.) can be controlled in a manner that leads to a complex clustering of covalently bonded carbon-to-carbon connected nano platelets (e.g., such as shown in FIGS. 9A-9L, according to various aspects). These materials can be collected as solid carbons that are formed from reactions within the plasma plume or in the thermal afterglow.

Figure 5:
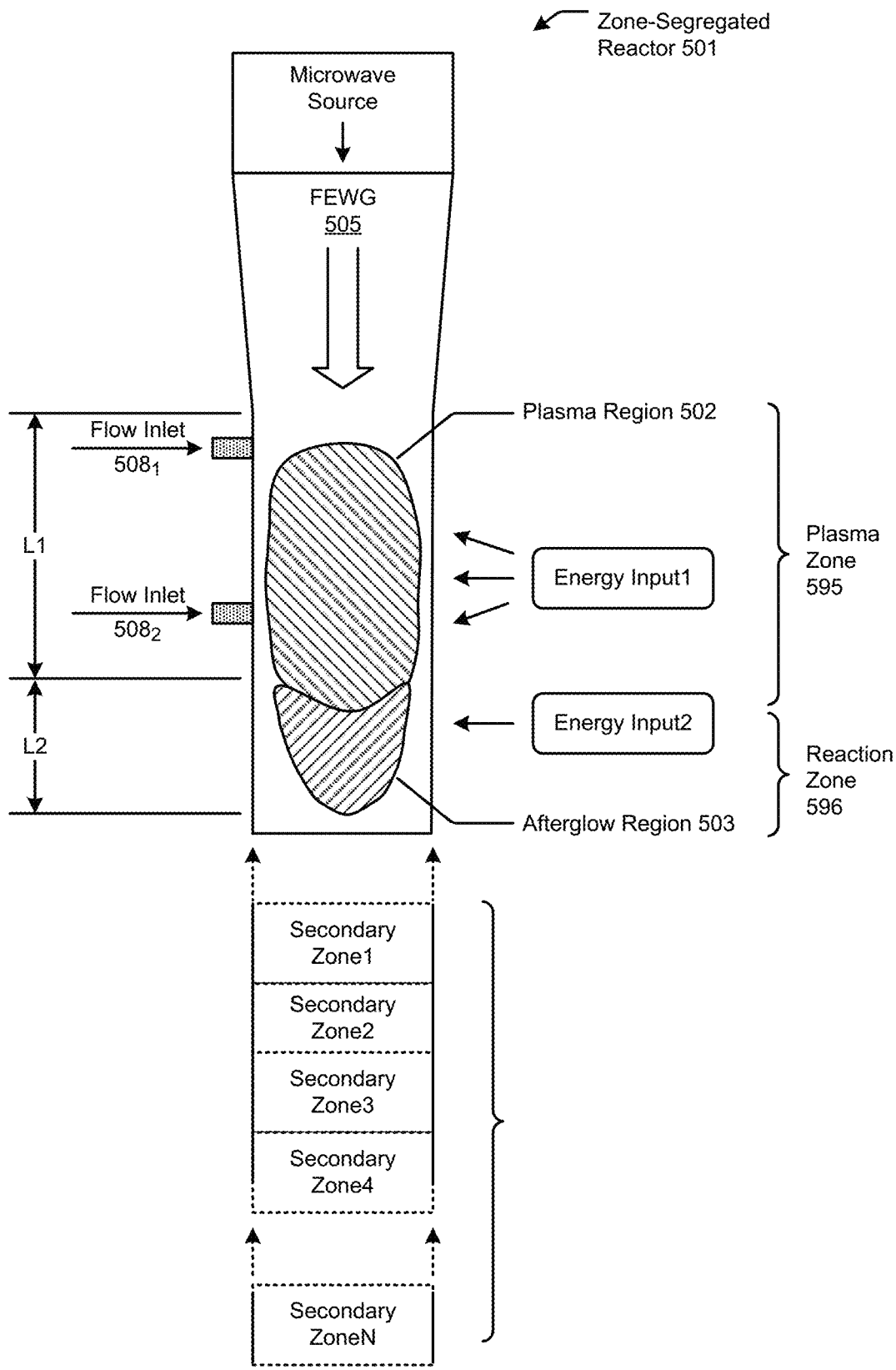
FIG. 5 is a simplified vertical cross-section of a microwave gas processing system having thermal plume energy sources, in accordance with aspects of the present disclosure.

FIG. 5 is a simplified vertical cross-section of a microwave gas processing system having thermal plume energy sources 523. The gas processing system comprises a zone-segregated reactor 501 that has two independently-controllable energy inputs (e.g., energy input1, and energy input2) that are separated substantially equidistantly to provide energy into the FEWG 505.

There may be many zones that are defined by various corresponding lengths of the FEWG 505. Strictly as one example, FIG. 5 depicts a plasma zone 595 defined by plasma column length (L1) and a reaction zone 596 defined by afterglow column length (L2). As shown in FIG. 5, the plasma zone has two flow inlets (e.g., flow inlet $508_1$ and flow inlet $508_2$) along the plasma column length. Each of the shown flow inlets are independently controllable such that a first flow inlet serves to introduce material at a first flow rate into a first location along the FEWG 505 and such that a second flow inlet serves to introduce second material at a second flow rate into a second location along the FEWG 505.

The ability to independently control the material flows while at the same time controlling the thermal plume energy sources along plasma column length leads to the ability to control the energy levels within the plasma region 502, which in turn leads to controllable selection of one or more reaction pathways that occur during conversion of the introduced materials into specific separated components. However, certain reaction pathways that occur during conversion of the introduced materials into specific separated components need a longer pathway and/or longer times being spent in the pathway and/or different temperature ranges along the pathway such that the plasma column length needs to be extended. This is accommodated by provision of the shown reaction zone 596 having an extended length. This is further accommodated by control of a set of thermal plume energy sources. In particular, temperature control of regions throughout the entire length of the FEWG 505 can be accommodated by selection, control, and positioning any of a variety of thermal plume energy sources. Strictly as an illustrative example, temperatures in plasma region 502 can be at least partially controlled by energy input1, while temperatures in afterglow region 503 can be at least partially controlled by energy input2., and while temperatures in any of the shown secondary zones can be at least partially controlled by additional thermal plume energy sources (not shown)

As such, the pathways and temperature contours through the FEWG 505 can be controlled, at least in part by selection and design of the FEWG, and at least in part by control of flows through the inlets, and at least in part by control of additional thermal plume energy inputs.

As used herein, the term 'thermal plume' refers to a region or regions within the reactor where plasma is formed and/or where chemical reactions are taking place. In exemplary aspects, two or more different, independently-controllable energy sources are provided in proximity to two or more regions within the reactor. Further, in exemplary aspects the average temperature in a first region (e.g., in plasma region 502) are higher than the average temperature in a second region (e.g., in afterglow region 503).

FIG. 5 depicts an afterglow region 503 that is in proximity to the shown plasma region 502. Different plasma and chemical processes can be controlled in one or both regions. In particular, the temperature contours in the plasma region can be controlled by controlling energy input1. This facilitates tight control of plasma interactions in the plasma region. Similarly, the temperature contours in the afterglow region can be controlled by controlling energy input2. This facilitates tight control of chemical interactions in the afterglow region.

Control of the specific chemical reactions of the introduced materials can be facilitated at least in part by controlling the temperature contours in and between the plasma region and the afterglow region. Control of the plasma and neutral gas temperatures can allow for optimization of the flux of building precursors, such as C2 radicals. For example, too much C2 in a small region can lead to formation of amorphous carbon and additional graphene layers; however, smaller concentrations of C2 over a longer region lead to controlled growth of graphene platelets which is advantageous for growing longer platelets, typically sought after in many applications. Therefore, rather than having an intense source of C2 over a small distance, having a controlled concentration of C2 over a longer period is advantageous to growth kinetics.

For further materials processing within the reactor, the FEWG 505 can be fitted with any number of components that define secondary intra-reactor zones 515 (e.g., secondary zone1, secondary zone2, secondary zone3, secondary zone4, . . . secondary zoneN). Each secondary zone can be independently sized by in a first dimension (as shown) and/or in a second dimension (not shown) by sizing its corresponding component. In some aspects, the order of the secondary zones can be determined based on a particular desired pathway. For example, secondary zone1 might be followed by secondary zone3, followed by secondary zone2, followed by secondary zone4, etc. In some aspects, a selection of secondary zones can be determined based on a particular desired pathway. For example, secondary zone1 might be followed by secondary zone3, without any further secondary zones. In some aspects, components that define any one or more of the secondary zones can be removably attached to a previous component and/or successive component(s). For example, a component that defines secondary zone1 can be removably attached to the FEWG 505 (as shown), and/or a component that defines secondary zoneN can be removably attached to any other component, including the FEWG 505 itself.

The depiction of the apparatus of FIG. 5 is not necessarily to scale. Moreover, the shown length L1 and length L2 of the FEWG 505 might be relatively longer or relatively shorter with respect to each other.

The physical shape of length L1 and length L2 can be designed to cause a longer or shorter residence time as materials pass through length L1 and length L2 of the reactor. Moreover, the different and independently-controllable energy inputs (e.g., energy input1, energy input2) serve to control the temperatures and temperature variations that materials passing through length L1 and length L2 of the reactor are subjected to.

The two separate flow inlets (flow inlet $508_1$ and flow inlet $508_2$) permit two or more materials to be mixed, either before or after entering the FEWG 505. Mixtures of materials that include, for example, an active material component and an electrically conductive material component are useful in many applications such as electronics, automotive and aerospace. Such mixtures of materials often benefit from some underlying structure. For example, some structural composites utilize a fibrous web or weave of material with high tensile strength to provide strength in one or two directions. Such a fibrous web or weave of material is embedded in a matrix material with a lower elastic modulus to provide flexibility. Another application that benefits from an underlying structure within a mixture of active and conductive materials are battery electrodes, where the active material is an energy storage material and metallic or carbon-based particles provide electrical conductivity.

Related to the underlying structure of such mixtures, the surface area of the active material or the conductive component can also be important. A high surface area can provide a high interfacial area either between the active material and the conductive material, or upon which reactions can take place. In many applications, carbon allotropes are attractive for the conductive material component in such mixed structured materials because they can be produced with high electrical and thermal conductivities, and with high surface areas.

Conventional approaches to making such composite materials include growing structured carbon allotropes (e.g., nanostructured graphene) on a substrate, and then depositing the active material component into the pores of the structured carbon material. However, while high quality carbon allotropes require high growth temperatures (e.g., greater than 500° C.), many other materials cannot withstand these high processing temperatures. Accordingly, the zone-segregated reactor 501 can be configured with an extended length of the FEWG 505 such that chemical processing at lower temperatures within afterglow region 503 can be carried out. Additional energy inputs (e.g., energy input2) may be provided and controlled so as to maintain a temperature or temperature contours at least though length L2.

Figure 6:
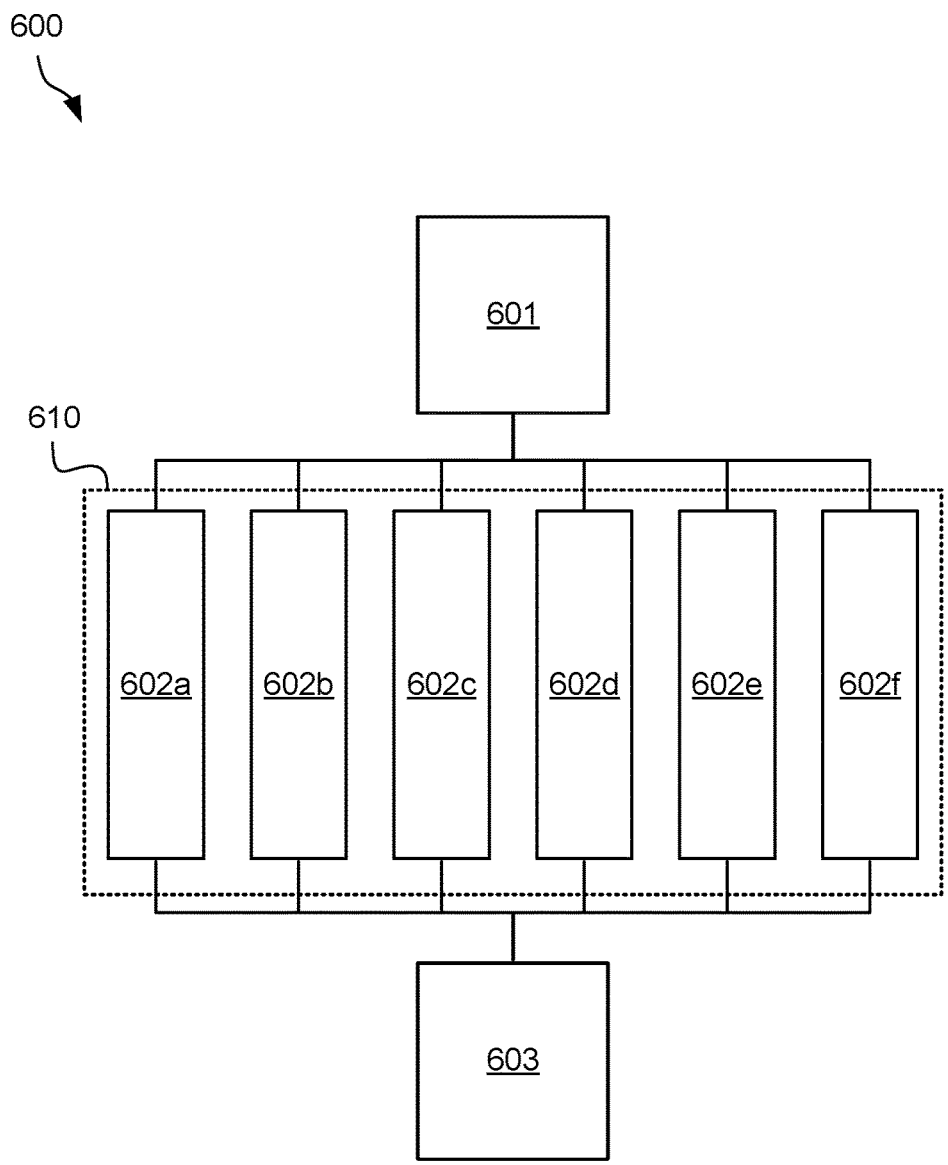
FIG. 6 illustrates an array of reaction chambers, in accordance with one aspect.

FIG. 6 shows an exemplary configuration 600 of a plurality of reaction chambers 602a-602f, in an array 610, according to one aspect. In some implementations, the configurations 600 may include an amplifier 601, the array 610 including multiple reaction chambers 602a-602f, and a receptacle 603, as shown in FIG. 6. That is, the configuration 600 of FIG. 6 includes one amplifier 601 coupled to the array 610 including six reaction chambers 602a-602f, which are collectively coupled to the receptacle 603. While the configuration 600 of FIG. 6 includes one amplifier 603 coupled to the array 610 including six reaction chambers 602a-602f collectively coupled to one receptacle 603, it shall be understood that alternative aspects of configuration 600 may include multiple amplifiers 601, and/or multiple receptacles 603 each respectively coupled to an array 610, which may include more or less than six reaction chambers. For example, one alternative aspect of configuration 600 includes two amplifiers coupled to an array including six reaction chambers, which are collectively coupled to one receptacle. Another alternative aspect of configuration 600 includes two amplifiers coupled to an array including six reaction chambers, which are collectively coupled to three receptacles. In addition, each of the reaction chambers may be configured as one or more of the reaction chambers 732 shown in FIG. 7.

The configuration 600 is shown as an example. Additional or fewer components may be coupled together to achieve specific output quantities of a carbonaceous material. For example, in some implementations, ten or more reaction chambers may be coupled to one amplifier. In addition, multiple amplifiers may be combined using a power combiner (not shown in FIG. 6). In this way, the microwave radiation output by each amplifier may be combined by the power combiner and subsequently emitted into one or more reaction chambers at higher energy levels. In some aspects, combination, and organization of multiple amplifiers, a power combiner, and multiple reaction chambers of the array may be referred to as "multiplexing." Multiplexing may include time-division multiplexing, referring to direction of the microwave radiation emitted by one or more amplifiers into one or more reaction chambers of the array. That is, through multiplexing, the microwave radiation may be directed to less than all of the reaction chambers of a respective array, or to particular groups of reaction chambers based on output preferences for the carbonaceous material.

Additional details regarding general approaches to powering multiple reaction chambers using a single microwave emitter can be found in U.S. Pat. No. 10,937,632, filed Aug. 14, 2017 and entitled "Microwave Chemical Processing Reactor," the contents of which are herein incorporated by reference.

Figure 7A:
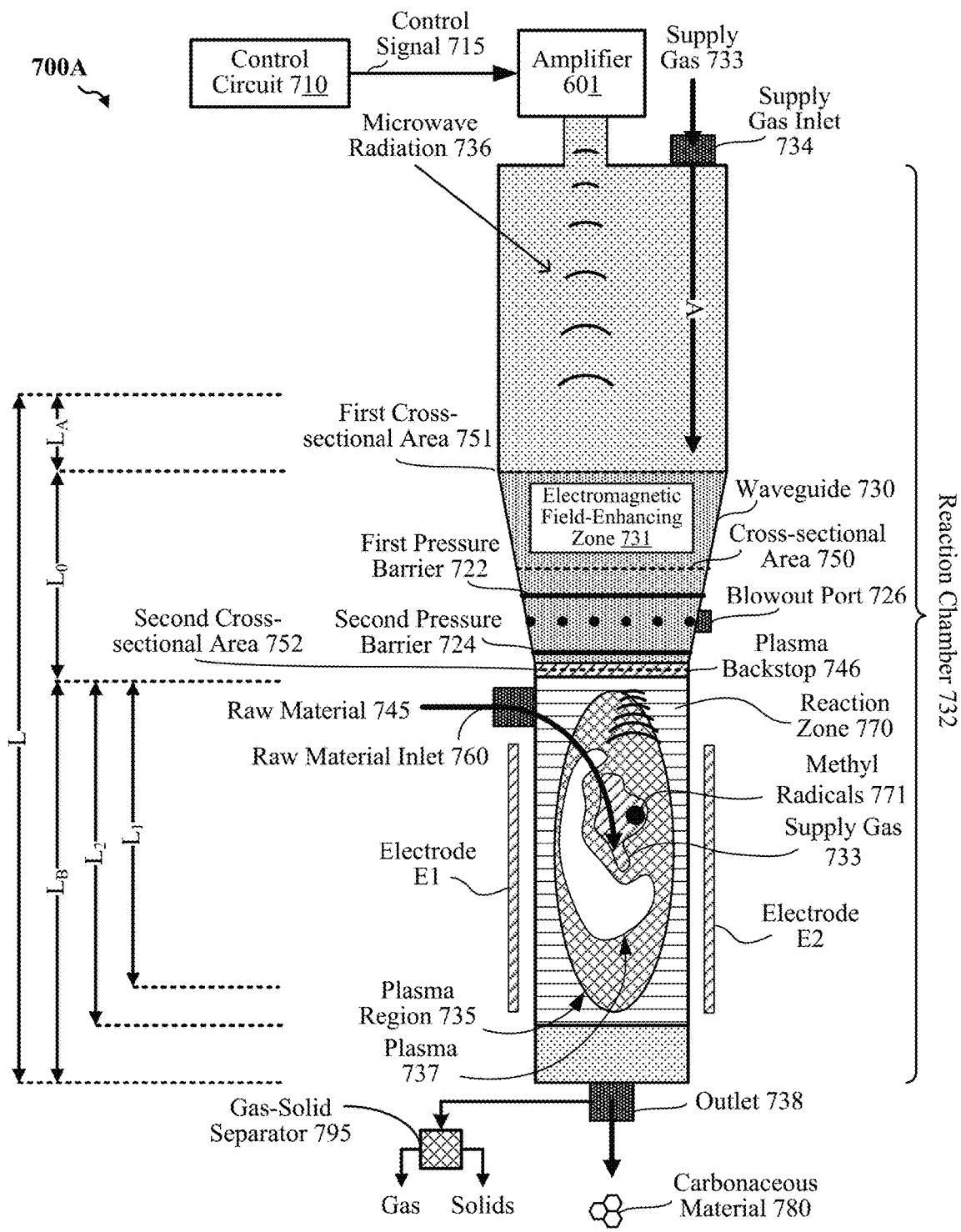
FIGS. 7A-7B depict simplified diagrams of example reactor systems, according to various aspects.
Figure 7B:
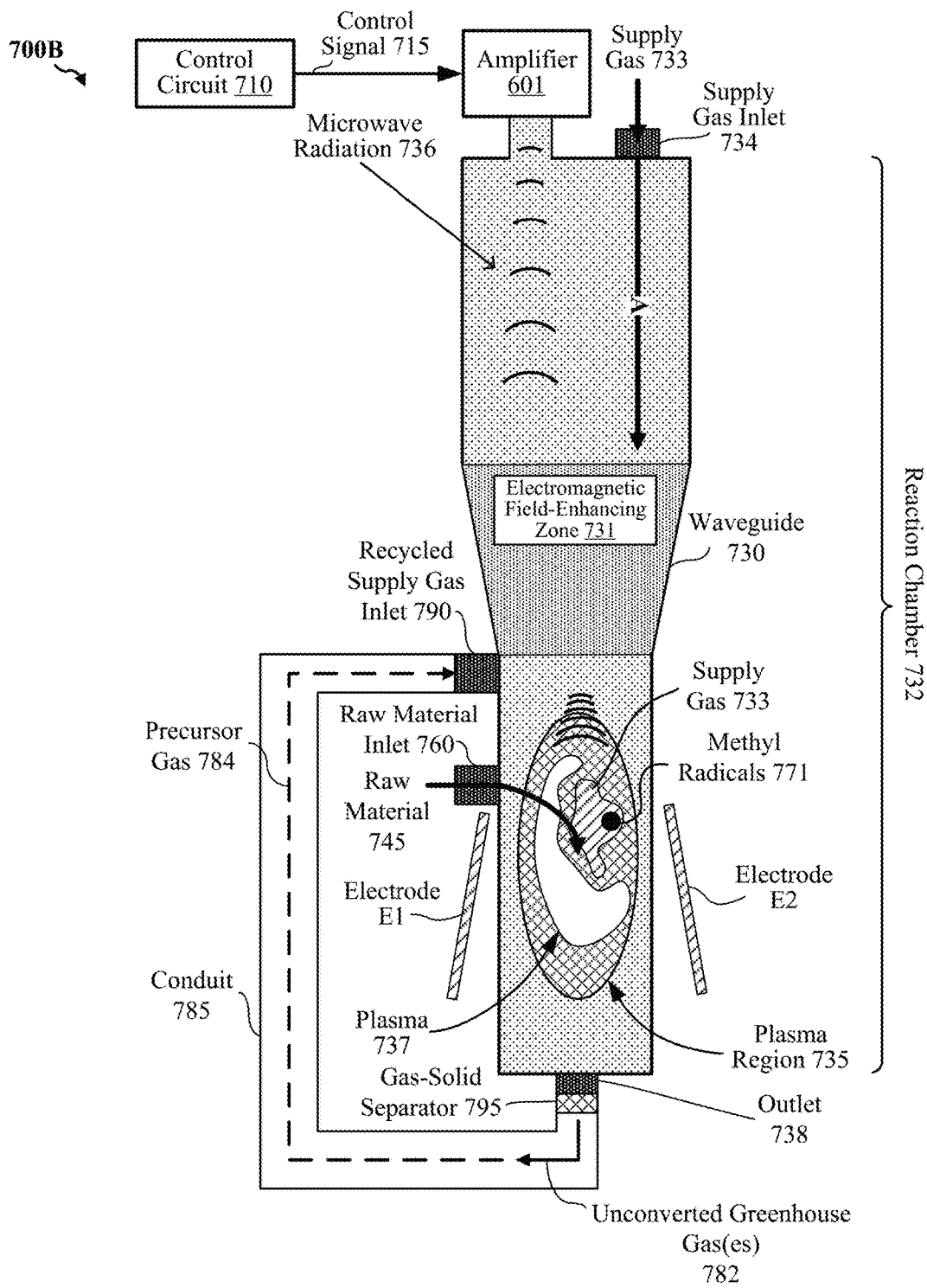

FIGS. 7A-7B show diagrams of example reactor systems 700A-700B, according to some implementations. In one implementation, each of the reaction chambers 732 of the reactor systems 700A-700B may be examples of the reaction chambers 602a-602f of the array 610. In addition, each of the reactor systems 700A-700B may include an electromagnetic field-enhancing zone 731 along length $L_0$ to concentrate the microwave radiation 736 emitted in the direction A through the reaction chamber 732. Also, in some implementations, each of the reactor systems 700A-700B may or may not include a dielectric barrier, such as a quartz chamber, separating the electromagnetic field-enhancing zone 731 from a reaction zone 770 along a length L2 of the reaction chamber 732.

The reactor system 700A may be coupled to a control circuit and/or an amplifier, e.g. amplifier 602 of FIG. 6. The reactor system 700A may include the reaction chamber 732, which may be one example of the reaction chambers 602a-602f of the system 600 of FIG. 6. In this way, the reactor system 700A may function in conjunction with any of the components associated with the system 600 of FIG. 6 to output the carbonaceous material 780.

The reaction chamber 732 of the reactor system 700A of FIG. 7A may include a supply gas inlet 734, a first pressure barrier 722, a second pressure barrier 724, a waveguide 730, the electromagnetic field-enhancing zone 731, a raw material inlet 760, a plasma 737 generated within a plasma region 735, and an outlet 738 configured to output the carbonaceous material 780. The first pressure barrier 722 and/or the second pressure barrier 724 may be positioned within a define proximity to the amplifier 601 to thereby protect the amplifier from exposure to backflow of the plasma 737 from the plasma region 735 toward the amplifier 601.

For example, in one implementation, the first pressure barrier 722 and/or the second pressure barrier 724 may be positioned within the waveguide 730 within the electromagnetic field-enhancing zone 731 as shown in FIG. 7A. In other alternative implementations, the first pressure barrier 722 and/or the second pressure barrier 724 may be positioned immediately prior to the plasma backstop 746 and along section length $L_B$ of the reaction chamber 732. In some aspects, the first pressure barrier 722 and/or the second pressure barrier 724 may be formed from quartz, ethylene tetrafluoroethylene (ETFE), other plastics, and/or ceramics. In addition, the reaction chamber 732 may include a blowout port 726 positioned between the first pressure barrier 722 and the second pressure barrier 724. The blowout port 726 may include one or more valves that may open when build-up of the supply gas 733 and/or the plasma 737 breaches the second pressure barrier 724. In this way, the blowout port 726 may exhaust substances as needed to return to desired operational conditions.

To activate and operate the reaction system 700A of FIG. 7A, the control circuit 710 may output the control signal 715 to control the amplifier 601 to emit the microwave radiation 736 at, for example, a specific pulse frequency in the direction "A" into the reaction chamber 732. In addition, the supply gas 733, which may include hydrogen, helium, noble gases, and/or a hydrocarbon-containing gas such as methane, $CH_4$, may be delivered and/or flowed by the supply gas inlet 734 into the reaction chamber in the direction "A." The supply gas 733 may be flowed downward throughout the reaction chamber 732 toward the outlet 738 and thereby at least temporarily reside within the reaction zone 770. In some aspects, the waveguide 730 may refer to external surfaces of the reaction chamber 732. The waveguide 730 may be tapered along section length $L_0$ to have a cross-sectional area 750 that incrementally decreases from a first cross-sectional area 751 toward a second cross-sectional area 752 to enclose the electromagnetic field-enhancing zone 731.

In this way, the microwave radiation 736 emitted by the amplifier 601 may be concentrated in the direction "A" within the electromagnetic field-enhancing zone 731 due to the incremental decrease of the cross-sectional area 750 along section length $L_0$. The concentrated microwave radiation 736 may electromagnetically excite the supply gas 733 in the reaction zone 770 to ignite and thereby self-generate the plasma 737 within the plasma region 735. In addition, electrodes E1 and E2 are preferably located on opposite sides of the reaction zone 770, and used to generate electrical fields that influence chemical reactions taking place within reaction zone 770. Most preferably, in operation, an approximately 180 degree phase difference is maintained between electrodes E1 and E2, whether the corresponding field is generated using direct current or alternating current.

The plasma may include carbon-containing free radicals, such as methyl radicals 771, which may combine and recombine within the plasma region 735 when further electromagnetically excited by the microwave radiation 736. This combination and recombination of the methyl radicals 771 may include self-nucleation to produce the carbonaceous material 780. In this way, the carbonaceous material 780 may be output from the reaction chamber 732 by the outlet 738.

In one implementation, the reaction chamber may have an overall length L, which may be further sub-divided into multiple section lengths including $L_A$, $L_0$, $L_B$, $L_2$, and $L_1$, any one or more of which may be reconfigured as shown in FIGS. 7A-7B, or in other configurations. For example, in some implementations, the reaction chamber 732 of the reaction system 700A may have an overall length L between approximately 10 centimeters (cm) and 15 cm to provide output quantities such as approximately between 10 g/hr. and 1 kg/hr. In other implementations, the reaction chamber 732 may have an overall length L between 40 cm to 60 cm for industrial-scale output requirements, such as more than 1 kg./hr. In addition, the second cross-sectional area 752 of the reaction chamber 732 along section length LB may have dimensions of approximately 2.5 cm by 7.5 cm for use with the microwave radiation 736 when delivered at a frequency of 2.45 GHz. In some aspects, dimensions of any one or more of the first cross-sectional area 751, the second cross-sectional area 752, and/or the cross-sectional area 750 may be chosen according to the frequency of the microwave radiation 736. For example, in some implementations, the second cross-sectional area 752 may be approximately 12 cm by 6.3 cm for usage with the microwave radiation 736 when emitted at a frequency of approximately 2.1 GHz-2.7 GHz. In addition, the first cross-sectional area 751 may be approximately 30%-100% larger than the second cross-sectional area 752.

In one implementation, the reaction chamber 732 may have a total length L, section length $L_A$, and section length $L_B$ as shown in FIG. 7A. In this implementation, the second cross-sectional area 752 in $L_B$ is smaller than the first cross-sectional area in $L_A$. The plasma 737 may be generated by self-ignition of the supply gas 733 input into the plasma region 735 in $L_1$ upon exposure to the microwave radiation 736. In this way, the plasma 737 may create an energetic environment suitable for processing of the raw material 745 into the carbonaceous material 780 and/or one or more components of the raw material 745. In some aspects, the total length L may be in an approximate range between 1 cm and 1,000 cm. Section length $L_0$ may be approximately between 1 cm and 100 cm. Section length Li may be approximately between 1 cm and 100 cm. Section length $L_2$ may be approximately between 1 cm and 1000 cm. In some implementations, relatively higher gas flow velocities may extend $L_1$ and/or $L_2$ by various proportions relative to their respective original lengths, such as from 0%-100%. In some aspects, the reaction chambers 732 of any one or more reactor systems 700A-700B of FIGS. 7A-7B, respectively, may maintain internal pressures within one or more approximate ranges, including approximately between 0.1 atm and 10 atm, and/or one or more ranges within 0.1. atm and 10 atm. Operating the reactor systems 700A-700B in a positive pressure environment may prevent unwanted backflow of the plasma 737 generated in the plasma region 735 towards the amplifier 601.

One or more of the reaction chambers 732 of the reactor systems 700A-700B may be made from innately conductive materials and/or materials including electrically-conductive coated layers to, for example, facilitate emission of greater than 90% of the microwave radiation 736 emitted by the amplifier 601. Suitable example may include metals, metal-containing materials, metal with a conductive coating, ceramics, ceramic-containing materials, ceramic material with a conductive coating, stainless steel, stainless steel coated with a conductive layer including aluminum, nickel, silver, or a nickel-silver alloy, stainless steel having an aluminum liner, and/or a ceramic material coated with a conductive layer.

The waveguide 730 and/or the reaction zone 770 of the reaction chamber 732 of one or more of the reactor systems 700A-700B may facilitate generation of the plasma 737 within the plasma region 735. In this way, the reaction chamber 732 may not require an additional or separate waveguide and/or quartz reaction chamber to generate the plasma 737. In addition, configurations of the waveguide 730 and/or the reaction zone 770 facilitating ignition of the plasma 737 may enable processing of larger volumes of the supply gas 733 up to 1,000 liters (L). For example, in some implementations, the raw material 745, such as particulate matter suspended in an inert gas flow stream, and/or the supply gas 733 may be flowed through the inlet 760 and/or the supply gas inlet 734, respectively, at one or more approximate flow rate ranges, such as 1 slm (standard liters per minute) to 1,000 slm, and/or any smaller ranges within 1 slm and 1,000 slm In other implementations, as the raw material 745 may be a liquid delivered into the reaction zone 770 of the reaction chamber 732 through the raw material inlet 760. The raw material 745 may be or include water, alkanes, alkenes, alkynes, aromatic hydrocarbons, saturated and/or unsaturated hydrocarbons, including alkanes, alkenes, alkynes, or aromatic hydrocarbons, ethanol, methanol, isopropyl alcohol (such as isopropanol), etc. In this way, the raw material may produce carbon and hydrogen as separated components. The flow rate of the raw material 745 in liquid-phase may be a percentage of the supply gas 733 flowed into the reactor, including from 0.001% to 1,000%, or from 0.001% to 100%, or from 0.001% to 10%, or from 0.001% to 1%, or from 0.001% to 0.1%, or from 0.01% to 1000%, or from 0.01% to 100%, or from 0.01% to 10%, or from 0.01% to 1%, or from 0.01% to 0.1%.

In some implementations, the raw material 745 may be a colloidal dispersion delivered through the raw material inlet 760 into the reaction chamber 732. For example, colloidal dispersions may include various unprocessed carbonaceous materials. Some examples of colloidal dispersions that can be used as the raw material 745 include one or more of solid particles from the Group 16, Group 14, Group 10, Group 9, Group 5, Group 2, Group 1, alloys thereof, mixtures thereof, and/or may be mixed with a liquid or a gas. Solid particles used in colloidal dispersions in the raw material 745 may be mixed with liquids, such as water, alkanes, alkenes, alkynes, aromatic hydrocarbons, saturated and unsaturated hydrocarbons, such as of alkanes, alkenes, alkynes, or aromatic hydrocarbons), ethanol, methanol, isopropyl alcohol, or mixtures thereof, such as a 50/50 mixture of ethanol/methanol.

In some aspects, the supply gas 733 and/or the raw material 745 may include one or more gas-phase substances, such as gases from Group 1 and Group 15-18, as well as inorganic compounds, such as a group 14 hydride. In this way, the raw material 745 may be processed within the reaction chamber 732 and produce the carbonaceous material 780, as well as one or more separated components including solid inorganic materials coated in organic materials, and composite materials with interlayers of organic/inorganic materials. The raw material 745, when prepared as a colloidal dispersion as presented above, may be flowed into the reaction chamber 732 as a percentage of the supply gas 733 flowed into the reactor, such as from 0.001% to 1000%, or from 0.001% to 100%, or from 0.001% to 10%, or from 0.001% to 1%, or from 0.001% to 0.1%, or from 0.01% to 1,000%, or from 0.01% to 100%, or from 0.01% to 10%, or from 0.01% to 1%, or from 0.01% to 0.1%.

In addition, the raw material 745 may be only a gas without particulate matter suspended in the gas. For example, in one implementation, the supply gas 733 may be an inert gas, such as argon, and the raw material may be a hydrocarbon-containing gas, such as $C_2H_2$, $C_2H_4$, $C_2H_6$. In addition, the raw material 745 may be methane ($CH_4$), and thereby be separated into components including hydrogen and nanoparticulate carbon. In other implementations, the raw material 745 may be carbon dioxide ($CO_2$) bubbled in water to yield separated components including oxygen, carbon, and water. In some aspects, the raw material 745 may be or include hydrogen sulfide ($H_2S$) to yield separated components, which can include hydrogen gas and sulfur. In some implementations, the raw material 745 may not contain carbon dioxide. In some other implementations, the raw material can be a complex gas-based material, such as silane ($SiH_4$), trimethylaluminum (TMA), trimethylgallium (TMG), glycidyl methacrylate (GMA), $SF_6$, and/or other substances and/or materials commonly used in the semiconductor industry for deposition and etching of metals and dielectrics.

In some aspects, one or more of the reaction chambers 732 of the reactor systems 700A-700B of FIGS. 7A-7B, respectively, may be coupled to a gas-solid separator 795, which may separate components output from the outlet 738. In the implementation shown by FIG. 7A, the gas-solid separator 795 may be separate from the reaction chamber 732, but other configurations may exist where the gas-solid separator 795 may be coupled with or integrally formed with the reaction chamber 732. The gas-solid separator 795 may receive processed materials including the carbonaceous material 780 from the outlet 738, as well as additional substances and/or gases including the raw material 745 and/or the supply gas 733, and one or more byproducts. In some implementations, the gas-solid separator 795 may separate the carbonaceous material 780 from one or more other components, such as carbon black, carbon nano-onions (CNOs), necked CNOs, carbon nanospheres, graphite, pyrolytic graphite, graphene, graphene nanoparticles, graphene platelets, fullerenes, hybrid fullerenes, single-walled nanotubes, and/or multi-walled nanotubes. One or more of the carbonaceous material 780 and/or solid components separated by the gas-solid separator 795 may include carbonaceous aggregates, each aggregate having a principal dimension of approximately 50 microns, or greater than 100 microns, or greater than 200 microns, or greater than 300 microns, or greater than 500 microns, or greater than 1,000 microns, or from 1 to 1,000 microns, or from 10 microns to 1,000 microns, or from 100 microns to 1,000 microns, or from 100 microns to 500 microns.

The plasma region 735 may be tuned in terms of various physical parameters including temperature, pressure, and/or density of the plasma 737 by the microwave radiation 736 output by the amplifier 601 to correspondingly tune the carbonaceous material 780 in terms of physical properties or characteristics. For example, the control circuit 710 may control the amplifier 601 to pulse emission of the microwave radiation 736 into the reaction chamber 732. Additional details of tuning the microwave radiation 736 in microwave chemical processing systems are disclosed in U.S. Pat. No. 9,812,295, which is assigned to the assignee of the present application and incorporated by reference herein in its entirety.

In some implementations, an average energy in the plasma 737 may be controlled by the control circuit 710 by, for example, altering a pulse period and/or by selecting a pulsing frequency to achieve a desired plasma energy. In addition, or the alternative, the average energy of the plasma 737 may be controlled by adjusting the duty cycle of the control signal 715. For example, time-averaged input power and the pulse period of the amplifier 601 may both be held constant, while the duty cycle of the control signal 715 may be varied. In some aspects, a shorter duty cycle may increase a magnitude of the power of the microwave radiation 736 emitted into the reaction chamber 732. In this way, a relatively low amount of power may be used to generate the carbonaceous material 780 at rates that may not be feasible at similar power settings and/or with continuous waveforms of the microwave radiation 736.

In some implementations, reaction pathways occurring within the plasma 737 in the plasma region 735 may be selected by controlling time-averaged power input into the plasma 737. For example, holding the duty cycle and pulse frequency of the amplifier 601 while increasing power input into the amplifier may cause an overall energy level of the plasma 737 to increase. In another example, more effective emission of the microwave radiation 736 into the reaction chamber 732 may also cause overall energy levels of the plasma 737 to increase at a constant duty cycle and pulse frequency, etc. In one implementation, the supply gas 733 and/or the raw material 745 may include methane, which may be separated into hydrogen and nanoparticulate carbon by the gas-solid separator 795. Generally, 4-6 eV may be required to dissociate methane, which is undesirable in circumstances where energy levels of the plasma 737 may settle at approximately 1.5 eV after an initial ignition energy spike. The control circuit 710 may cause the amplifier 601 to pulse emission of the microwave radiation 736 to maintain average plasma energy at relatively higher levels.

The plasma 737 in the plasma region 735 of the reaction chamber 732 may be a non-thermal equilibrium plasma and thereby constant change one or more physical or chemical parameters including temperature to allow the microwave radiation 736 to penetrate deeper and/or more fully into the plasma 737. For example, in some implementations, average energy of the plasma 737 over an entire pulse period may be from 0.9 eV to 20 eV, or from 0.9 to 10 eV, or from 1.5 eV to 20 eV, or from 1.5 eV to 10 eV, or greater than 0.9 eV, or greater than 1.5 eV. Energy of the plasma 737 may be tuned based on preferences of the carbonaceous material 780 as controlled by the control circuit 710. For example, the control circuit 710 may cause the amplifier to emit the microwave radiation 736 at one or more defined frequencies including 915 MHz, 2.45 GHz, or 5.8 GHz. The control circuit 710 may enable a pulse frequency from 500 Hz to 1000 kHz, or from 1 kHz to 1000 kHz, or from 10 kHz to 1000 kHz, or from 40 kHz to 80 kHz, or from 60 kHz to 70 kHz, or greater than 10 kHz, or greater than 50 kHz, or greater than 100 kHz.

The amplifier 601 may emit the microwave radiation 736 as a continuous wave or in a pulsed manner with a time-average power from 1 to 100 kW, or from 1 kW to 500 kW, or from 1 kW to 1 MW, or from 10 kW to 5 MW, or greater than 10 kW, or greater than 100 kW, or greater than 500 kW, or greater than 1 MW, or greater than 2 MW. In some aspects, the pulse period has a first duration where the microwave power is on, and a second duration where the microwave radiation 736 is off or at a lower power than during the first duration. The second duration can be longer than the first duration. The optimal duty cycle for a given system depends on many factors including the microwave power, pulse frequency, and pulse shape. The duty cycle (such as the fraction of the pulse period where the microwave radiation 736 is on, expressed as a percentage) can be from 1% to 99%, or from 1% to 95%, or from 10% to 95%, or from 20% to 80%, or from 50% to 95%, or from 1% to 50%, or from 1% to 40%, or from 1% to 30%, or from 1% to 20%, or from 1% to 10%, or less than 99%, or less than 95%, or less than 80%, or less than 60%, or less than 50%, or less than 40%, or less than 30%, or less than 20%, or less than 10%.

The reaction chamber 732 may not include a dielectric barrier, such as a quartz window. During operation of reactor systems with dielectric barriers, intensity of microwave radiation emitted through the dielectric barrier may be reduced. In this way, lower amounts of microwave radiation may be available to electromagnetically excite supply gas, resulting in the ignition of correspondingly lower quantities of plasma. In addition, the parallel orientation of delivery of supply gas from the supply gas inlet 734 with emission of the microwave radiation 736 may prevent against unwanted build-up of byproducts on various internal surfaces of the reaction chamber 732. In some aspects, the reaction chamber 732 may include a plasma backstop 746, which may prevent plasma in the plasma region 735 from backflowing toward the amplifier 601 and/or the supply gas inlet 734. The plasma backstop 746 may be formed from a ceramic or as a metallic filter including holes, which may permit passage of the microwave radiation 736 while preventing more than 80% of plasma from backflowing as so described.

The raw material inlet 760 maybe positioned as shown in FIG. 7A between the waveguide 730 and the reaction zone 770. In addition, or the alternative, the raw material inlet 760 may be positioned on the reaction chamber 732 within section length $L_0$, $L_A$, or other section lengths along the overall length L. Walls of the reaction chamber 732 enclosing the reaction zone 770 and the plasma region 735 may be formed with holes to accommodate inward flow of gaseous species delivered by the raw material inlet 760. In some implementations, the raw material inlet 760 may also deliver the supply gas 733 into the reaction chamber 732 in addition to or in place of the supply gas 733 delivered by the supply gas inlet 734. The raw material inlet 760 may also deliver (e.g., inject) raw materials, such as carbon black and/or other forms of unprocessed carbonaceous materials into the reaction zone 770.

FIG. 7B shows an example configuration of reaction chambers 602a-602f, according to some implementations. The reactor system 700 may be similar to the reactor system 700A of FIG. 7A in many respects, such that description of like elements is not repeated herein. In some implementations, the reactor system 700B may include a recycled supply gas inlet 790, which may receive a precursor gas 784 that may supplement the supply gas 733 to create the plasma 737. The precursor gas 784 may include one or more of hydrogen, argon, helium, or various noble gases. Moreover, similar to the aspect shown in FIG. 7A, reactor system 700B as shown in FIG. 7B includes electrodes E1 and E2 positioned on opposing sides of the reaction zone, which are used to generate electrical fields and influence chemical reactions occurring in the reaction zone. According to the aspect of FIG. 7B, the electrodes E1 and E2 are positioned at an angle relative to the reaction zone, resulting in varied field strength along the length of the reaction zone (due to differing distance between the respective electrode(s) and reaction zone). While the electrodes E1 and E2 shown in FIGS. 7A and 7B are depicted as flat electrodes, those having ordinary skill in the art will appreciate that other electrode configurations, e.g., curved, circular, patterned, etc. electrodes, may be employed without departing from the scope of the presently described inventive concepts. Disposing electrodes E1 and E2 at an angle relative to the reaction zone facilitates a more uniform reaction pathway flux density, in preferred approaches. In the example configuration of the reactor system 700B of FIG. 7B, the gas-solid separator 795 may be coupled to the outlet 738 and separate materials output by the outlet 738 from the reaction chamber 732 to yield unconverted greenhouse gases 782.

In other implementations, the unconverted greenhouse gases 782 may be recycled back into the reaction chamber 732 through a conduit 785 into the recycled supply gas inlet 790 to be used as the precursor gas 784. Recycling of the unconverted greenhouse gases 782 may add energy to the plasma 737, and may also thermally crack the raw material . For example, in one implementation, the unconverted greenhouse gases 782 can be 2 standard liters per minute (slm) to 10 slm of hydrogen gas ($H_2$), which may be recycled back into the waveguide 730 of the reaction chamber 732 through the conduit 785. In this way, the reaction chamber 732 may output a total of 150 to 200 slm of $H_2$. In addition, or the alternative, an amount less than the entirety of the unconverted greenhouse gases 782 may be recycled to meet specific output requirements of the reaction chamber 732.

For example, in one implementation, approximately 50% of the 2-10 slm of $H_2$ may be recycled back to the waveguide 730 as shown, with the balance output from the gas-solid separator 795. In other implementations, the amount or proportion of the unconverted greenhouse gases 782 may be based on the identity of the supply gas 733. For example, in one implementation, the supply gas 733 may be hydrogen gas and the raw material 745 may be methane ($CH_4$). In this way, the methane may be exposed to and electromagnetically excited by the microwave radiation 736 emitted by the amplifier 601 as controlled by the control circuit 710. The plasma 737 may be a hydrogen-based plasma generated in the plasma region 735 of the reaction chamber 732 based on excitation of some of the methane by the microwave radiation. Remaining portions of the methane may be cracked upon exposure to the microwave radiation 736 to generate the methyl radicals 771 and hydrogen gas. In this way, at least some of the hydrogen produced from cracking the methane may be recycled as the unconverted greenhouse gases 782 and form the precursor gas 784 input into the recycled supply gas inlet 790. This recycled gas may then be used to further crack methane prevalent in the plasma region to enhance operational efficiency of the reaction chamber 732. In addition, recycled hydrogen may be at a relatively high temperature, thereby warming methane in the plasma region and requiring lower energy input from the microwave radiation 736.

Figure 8:
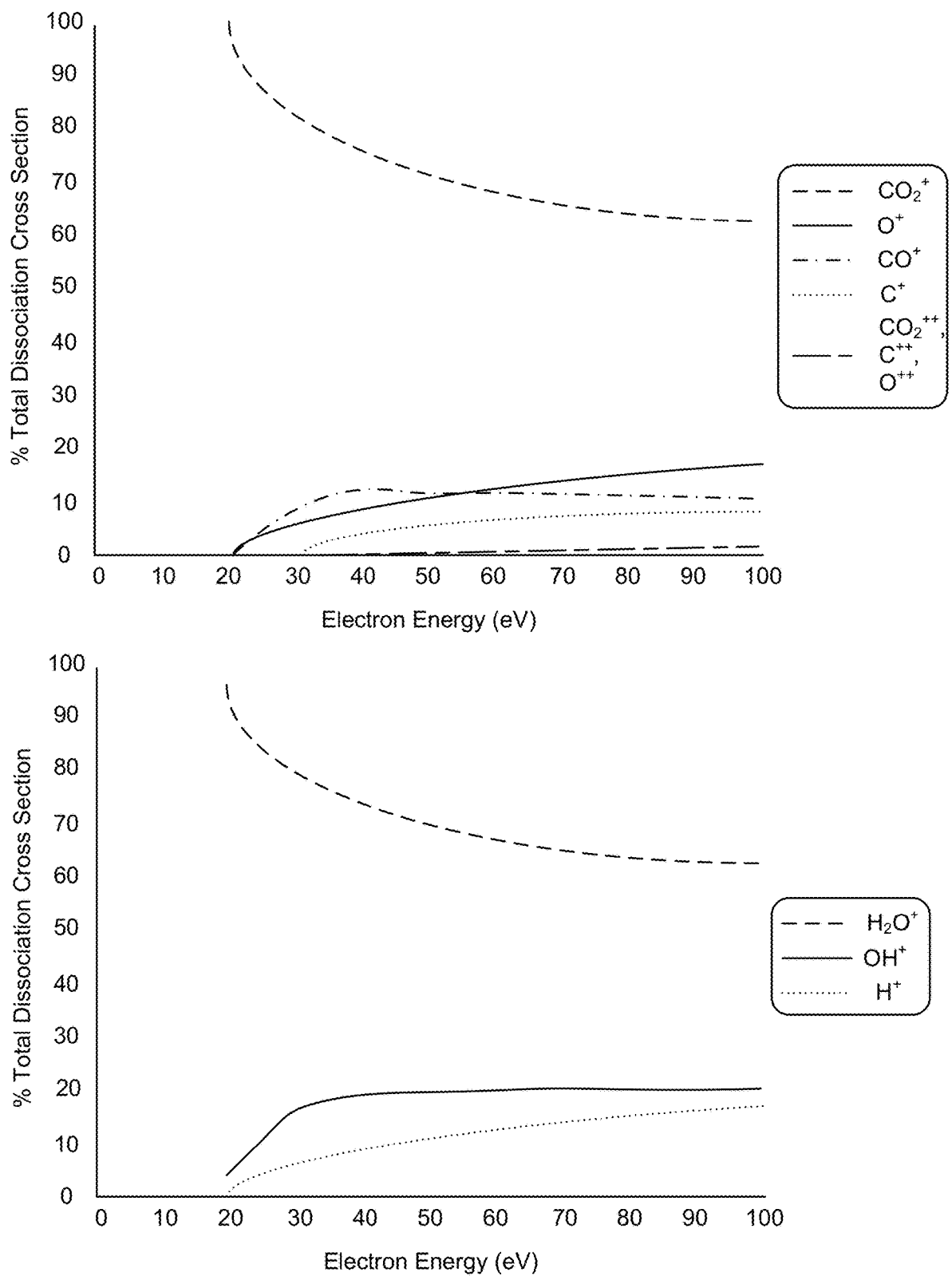
FIG. 8 illustrates an energy tuning chart depicting sample dissociation states for carbon dioxide and water, in accordance with one aspect.
Figure 9A:
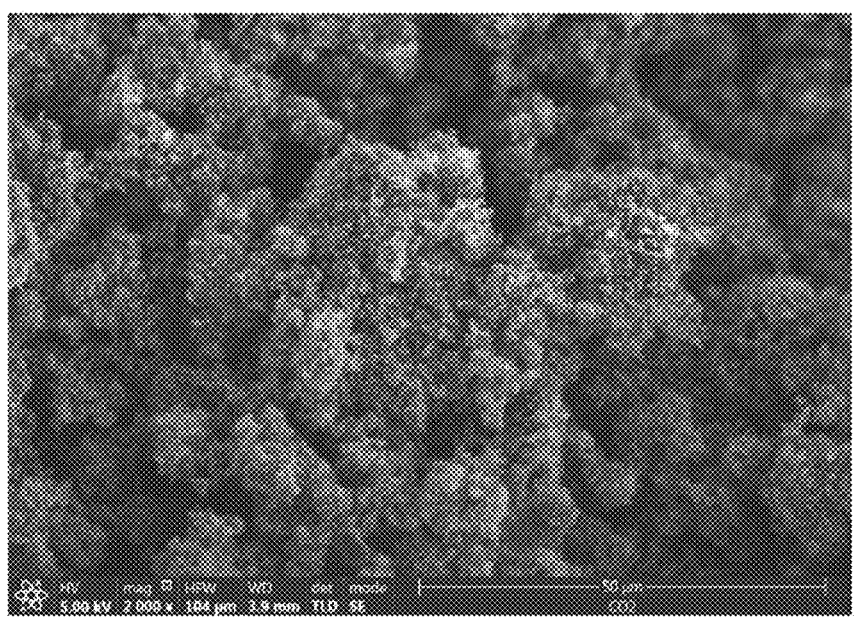
FIGS. 9A-9L are scanning electron micrograph (SEM) images of various aspects of carbon output produced in accordance with the presently disclosed inventive concepts.
Figure 9B:
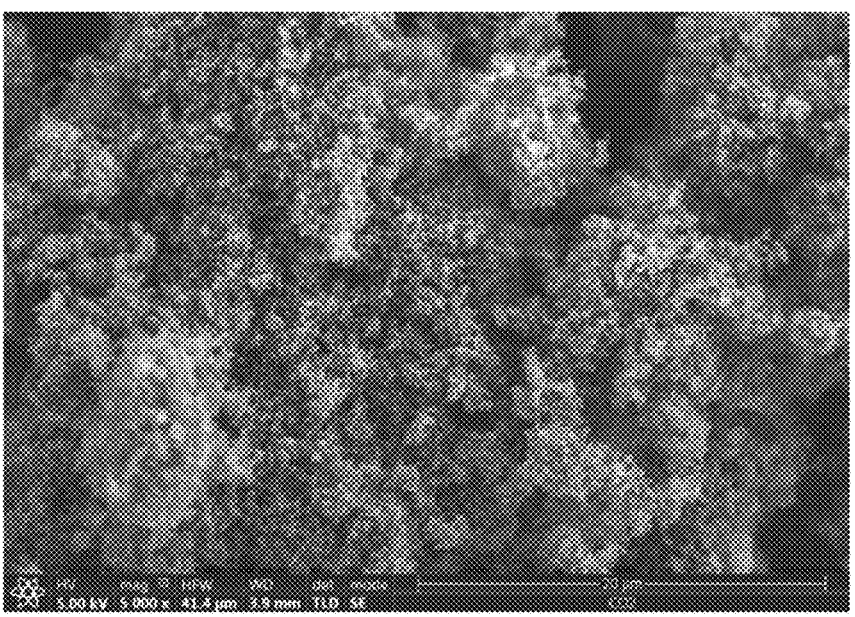
Figure 9C:
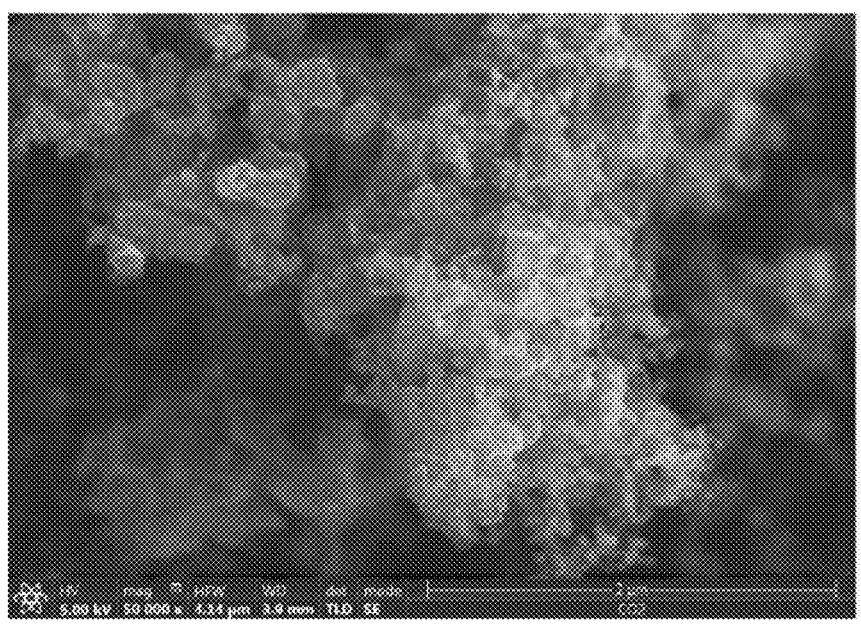
Figure 9D:
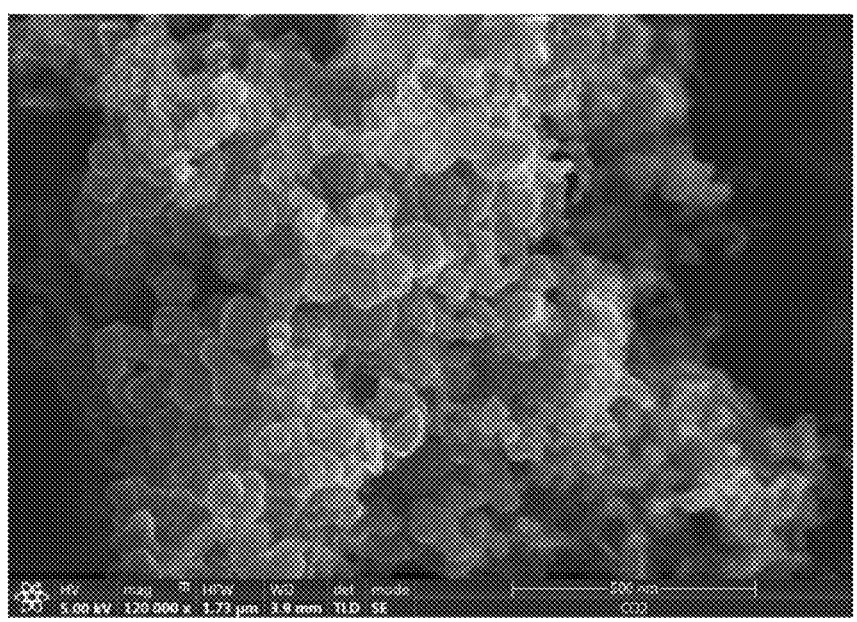
Figure 9E:
Figure 9E:
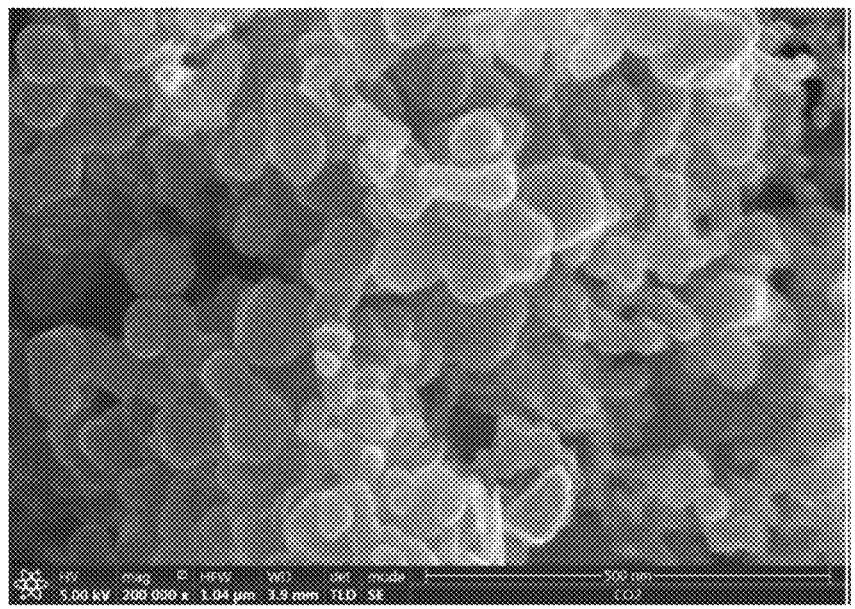
Figure 9F:
Figure 9F:
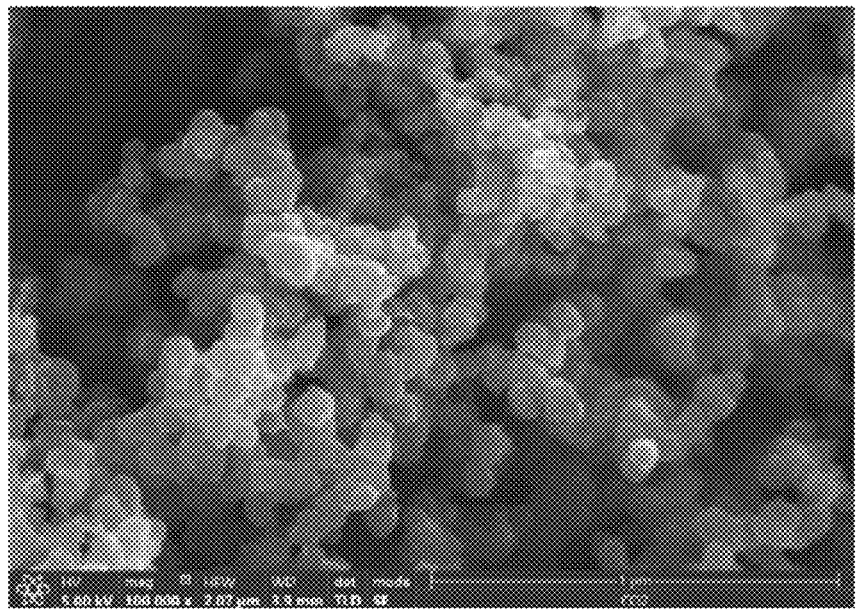
Figure 9G:
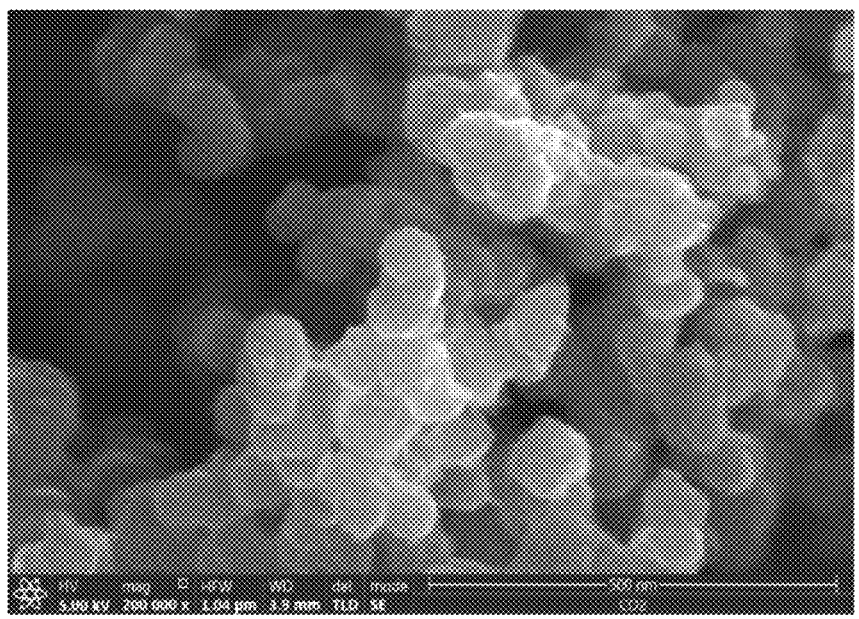
Figure 9H:
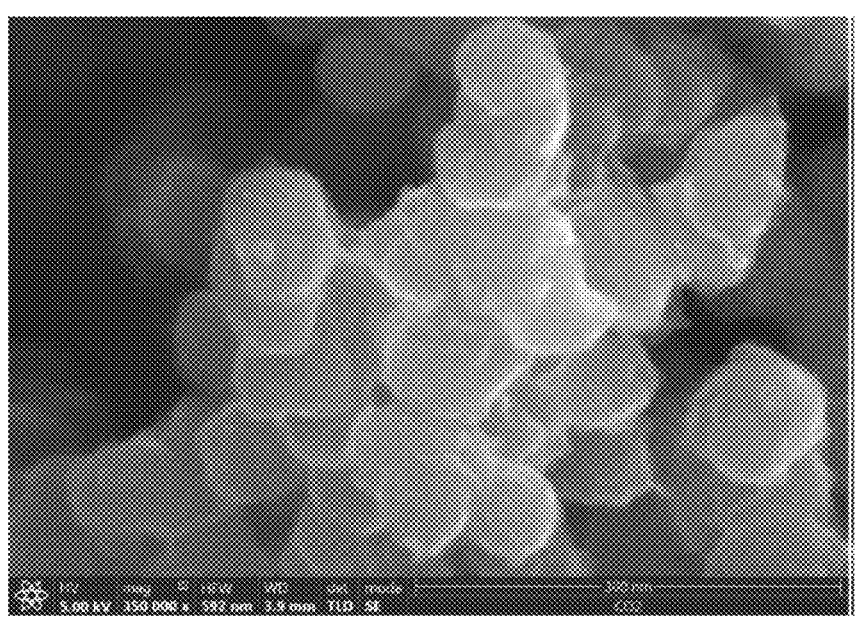
Figure 9I:
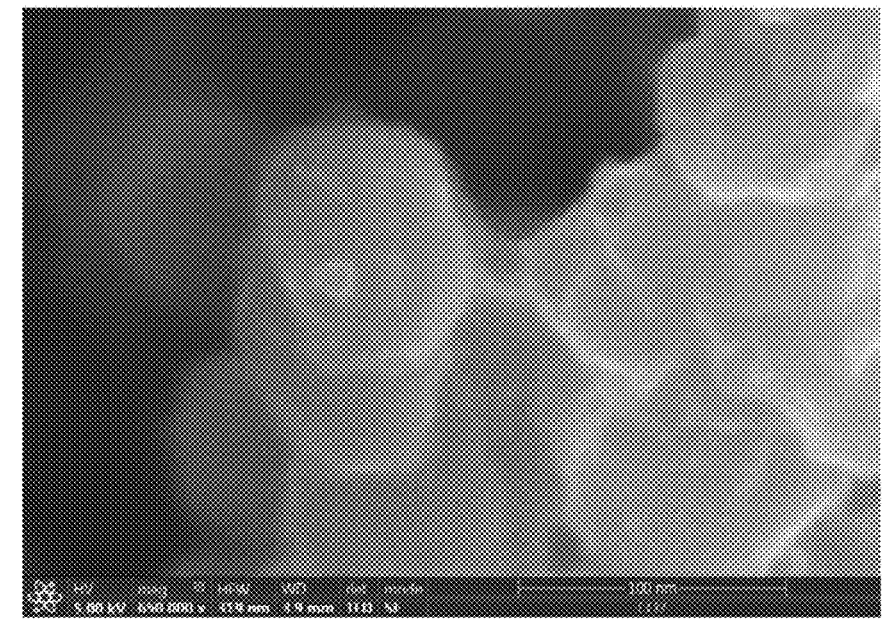
Figure 9J:
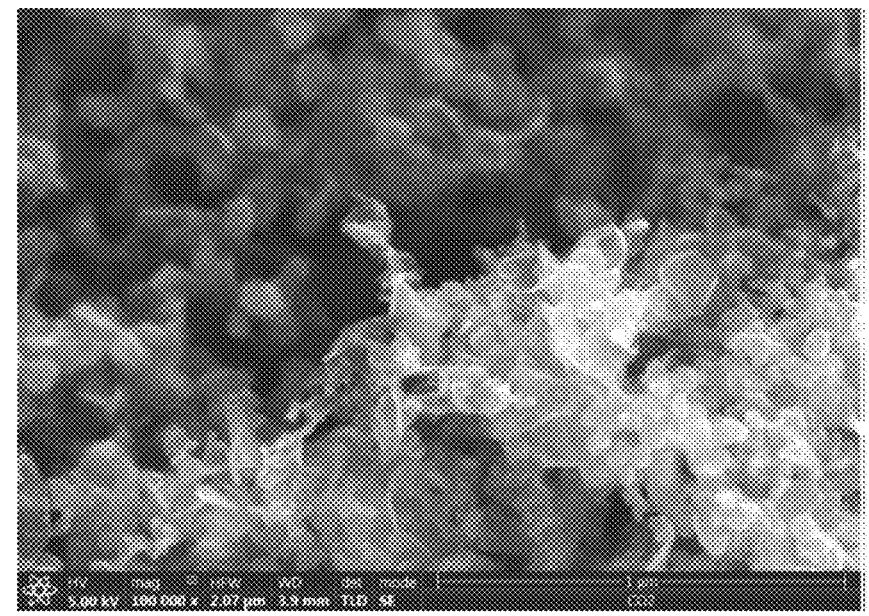
Figure 9K:
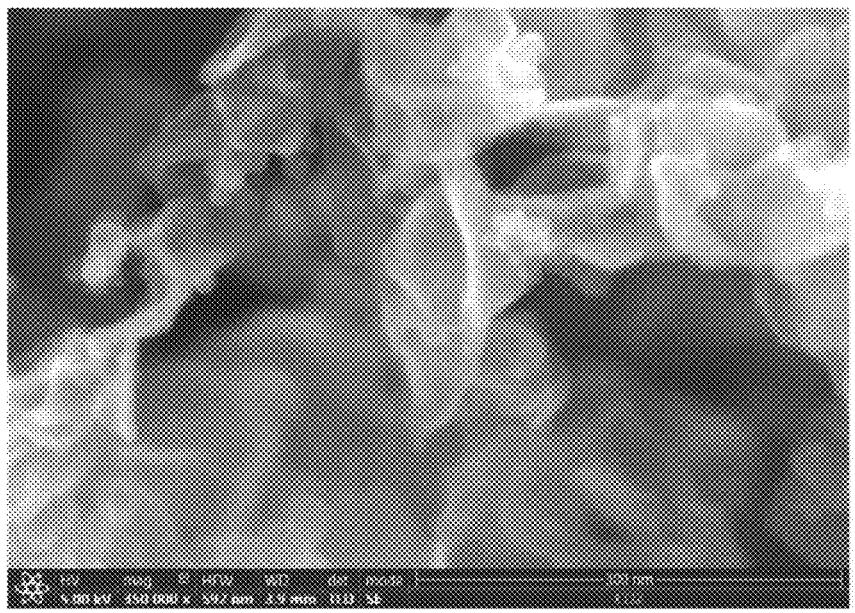
Figure 9L:
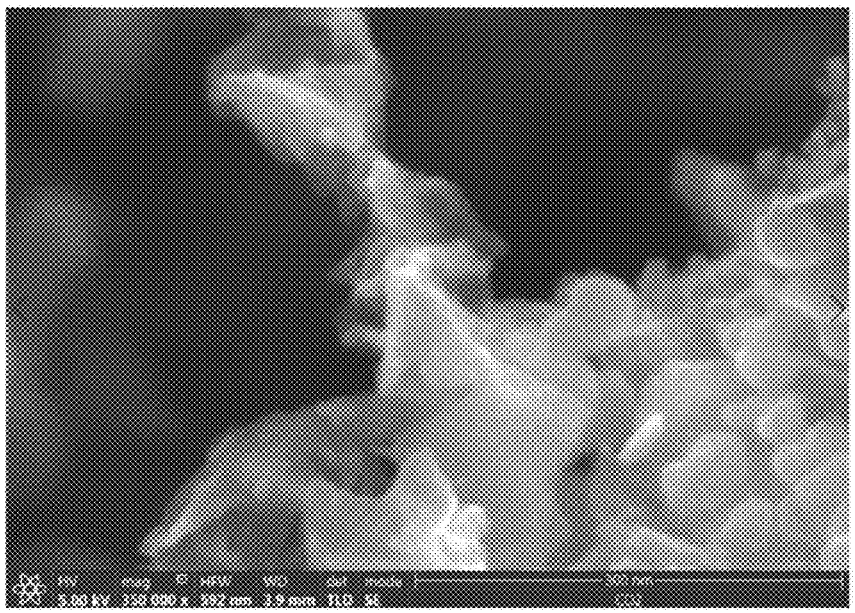

FIG. 8 illustrates an energy tuning chart depicting sample dissociation states for carbon dioxide and water, in accordance with one aspect.

Atmospheric pressure plasma conditions have been demonstrated utilizing microwave radiation superimposed upon a modulated electric field. The superposition of microwave radiation serves to increase electron density and lower the requirements for Paschen's breakdown (dissociation) due to the modulated electric field. Atmospheric pressure plasma formation from gases including argon, nitrogen, carbon dioxide, oxygen, and helium has been investigated experimentally and some configurations and tunings achieve dissociation fractions approaching 0.95.

An electron impacting a molecule at a given energy (eV) has an effective cross-sectional area for dissociation. For instance, a 100 eV electron impacting a nitrogen gas molecule will have an effective dissociation cross-section of $2.19E^{-16}$ cm$^2$. If the dissociating molecule has multiple dissociation states, such as depicted in the two charts of FIG. 8, there will be an effective dissociation cross-section for each state. The relative ratio of one dissociation cross-section versus the sum-total provides the statistical probability that such an dissociation state will be created.

As can be seen from FIG. 8, and referring first to the upper portion depicting dissociation states for carbon dioxide input, it is clear that metastable $CO_2^+$ is the predominant species produced at all dissociation energies, with a cross section ranging from about 100% (at approximately 25 eV) to about 65% (at approximately 100 eV). Other species with appreciable cross sections (~10-20%) in the same energy range include $O^+$, $CO^+$, and $C^+$. Notably, doubly dissociated species $CO2^{++}$, $C^{++}$, and $O^{++}$ are all produced in negligible amounts across the entire energy range.

Referring now to the lower portion of FIG. 8, dissociation cross sections and corresponding energies are shown for dissociation of water. Again metastable water ($H_2O^+$) is the predominant species generated across the dissociating energy range. However, dissociated hydroxide $OH^+$ is present with a cross section of approximately 20% at energies above approximately 30 eV, and dissociated hydrogen (protons) exhibit a cross section of about 7% at energies of about 30 eV, and climb to about 15% as energy rises to 100 eV.

From the plots shown in FIG. 8, therefore, it is clear that producing desired species for conversion of carbon dioxide into solid carbon (e.g., according to various pathways shown in FIGS. 3A-3G), plasmas having an energy of at least 20 eV are required, and plasmas having an energy of about 100 eV are particularly suitable for boosting conversion efficiency to the desired levels described herein.

As shown and discussed hereinabove, particularly with reference to FIGS. 3A-3G, controlling the dissociation states of these various species, and corresponding chemical reactions to convert carbon dioxide into solid carbon, is a primary focus of the presently disclosed inventive concepts. Indeed, sample images of several such solid carbons are given in FIGS. 9A through 9L, as follows, according to some exemplary aspects.

The materials shown in FIGS. 9A through 9L are SEM pictures (picture 9A00, picture 9B00, picture 9C00, picture 9D00, picture 9E00, picture 9F00, picture 9G00, picture 9H00, picture 9I00, picture 9J00, picture 9K00, picture 9L00) of the actual solid carbon output of the carbon dioxide cracking process within an applicator 601 such as is shown in FIG. 6, and discussed generally with reference to FIGS. 4-7B above. More specifically, gaseous carbon dioxide and other gases that are mixed in the applicator so as to dissociate the gases into molecular species such that carbon grows onto other carbons to form particulate carbon solids. As earlier indicated, the solid carbons are collected, thus yielding a carbon capturing mechanism for $CO_2$ greenhouse gas mitigation. These captured carbons are not waste. In fact, these solid carbons have many industrial uses. A sampling of such industrial uses is mentioned supra.

Figure 10:
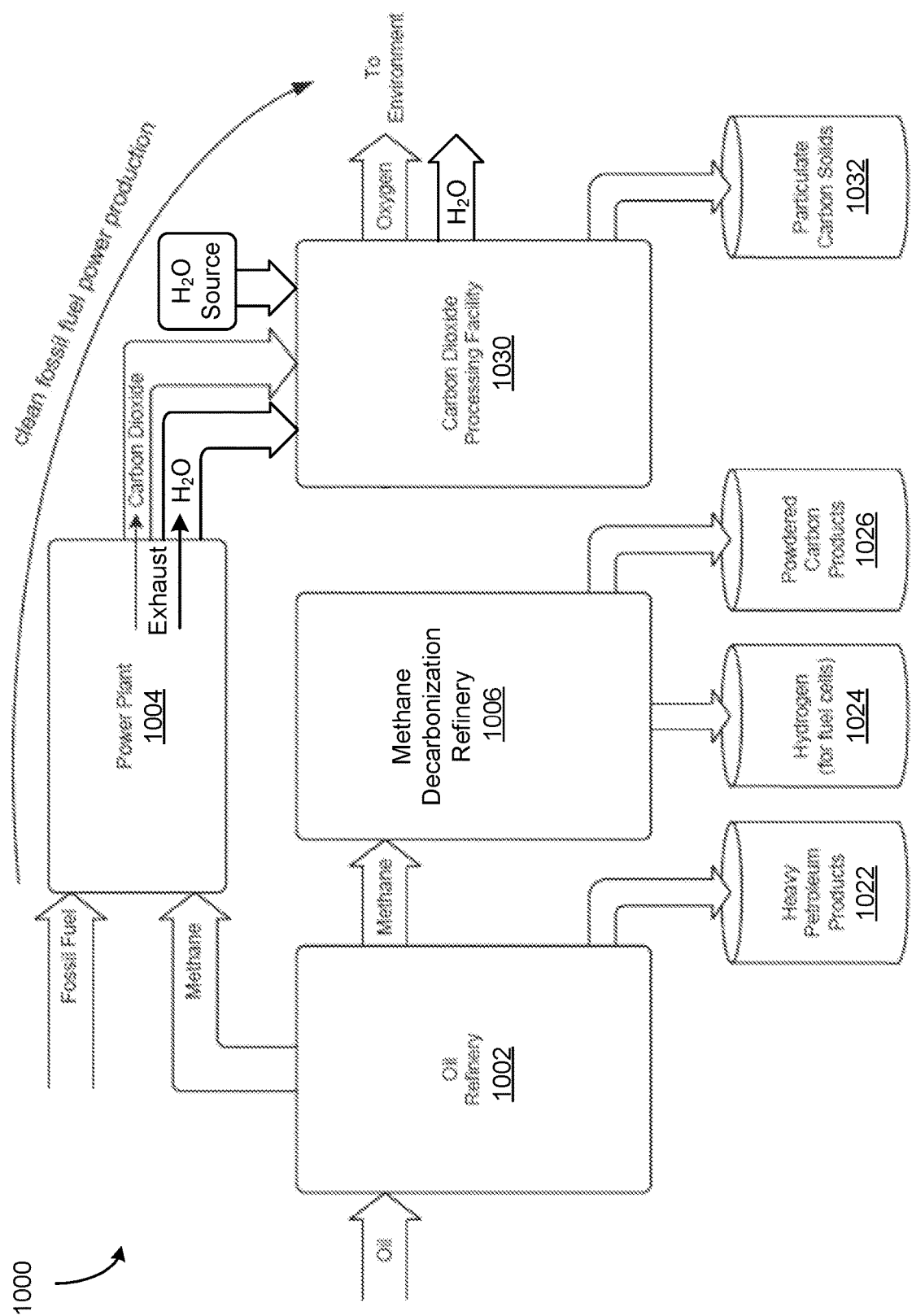
FIG. 10 illustrates a simplified schematic of a carbon dioxide processing facility coupled to various sources of fossil fuel and greenhouse gases, including an oil refinery, a power plant, and a machine refinery, in accordance with one aspect.

FIG. 10 shows a simplified schematic 1000 of a carbon dioxide processing facility 1030 coupled to various sources of fossil fuel and greenhouse gases, including an oil refinery 1002, a power plant 1004, and a methane decarbonization refinery 1006, in accordance with one aspect. Accordingly, FIG. 10 depicts an arrangement of systems corresponding to a fossil fuel-based producer-consumer ecosystem.

The schematic shows a molecular flow progression from consumption of fossil fuels to generation of non-polluting resultants. Operation of components of the producer-consumer ecosystem facilitate practice of methods for high-efficiency solid carbon capture for clean fossil fuel power production. Specifically, the component labeled as the carbon dioxide processing facility 1030 includes piping or other means for directing a stream of exhaust from a power plant 1004 into a carbon dioxide processing facility 1030 having a microwave reactor therein. Optionally, water may be present in the Exhaust, and/or water may be provided to the carbon dioxide processing facility 1030 from a supplemental $H_2O$ Source. The microwave reactor is configured to dissociate the carbon dioxide of the exhaust into gaseous oxygen and particulate carbon solids 1032. The carbon dioxide processing facility 1030 is configured for (1) releasing gaseous oxygen and water into the environment; and (2) is further configured for (2) capturing the particulate solid carbon into a containment vessel.

In some cases, the carbon dioxide processing facility 1030 receives outputs (e.g., water vapor $H_2O$) from the power plant 1004, and methane decarbonization refinery 1006 receives outputs (e.g., methane) from an oil refinery 1002.

As shown, the oil refinery 1002 and/or the methane decarbonization refinery 1006 also produces heavy petroleum products 1022 (e.g., diesel oil, gasoline, petroleum coke, etc.) and hydrogen 1024. In some cases, the methane refinery is configured to produce powdered carbon products 1026.

As depicted, all of the molecules of the inputs and outputs are consumed (e.g., to produce electricity), or are released a clean gaseous oxygen, or are captured as solid particulate carbon. In some ecosystems, the oil refinery produces many products other than the shown methane and heavy petroleum products 1022. For example, the oil refinery may produce other products such as naphtha and butane. Further, the oil refinery may produce by-products (e.g., $H_2S$) that is processed in additional downstream facilities (e.g., in a sour water steam stripper).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 11:
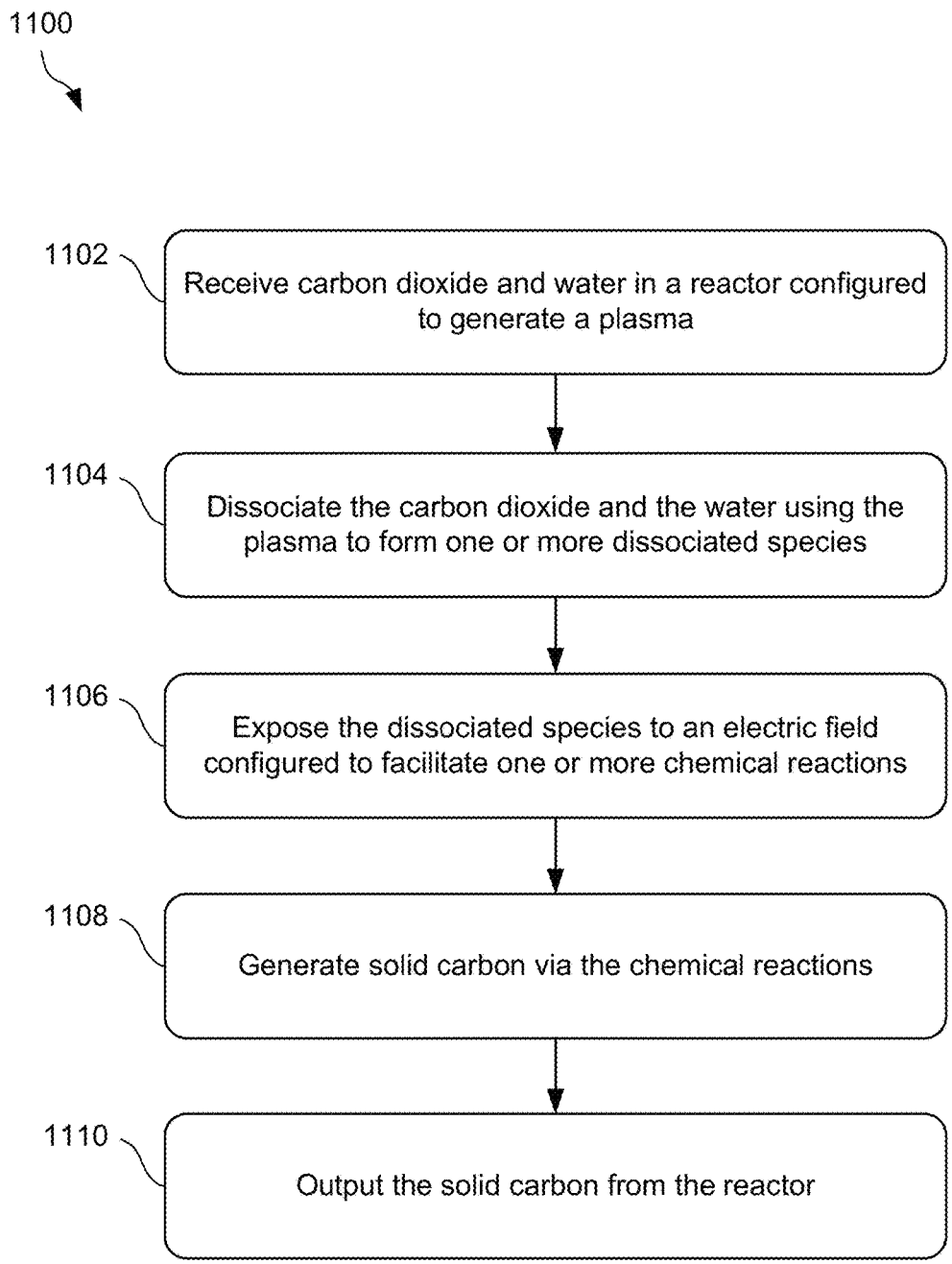
FIG. 11 illustrates a flowchart of a method, in accordance with one aspect.

FIG. 11 illustrates a method 1100 for converting carbon dioxide into solid carbon, in accordance with one aspect. As an option, the method 1100 may be implemented in the context of any one or more of the aspects set forth in any previous and/or subsequent figure(s) and/or description thereof. Of course, however, the method 1100 may be implemented in the context of any desired environment. Further, the aforementioned definitions may equally apply to the description below.

As shown in FIG. 11, method 1100 includes receiving carbon dioxide and water in a reactor configured to generate a plasma in operation 1102. The carbon dioxide and/or water may be received in any suitable manner, e.g., via injection into the reactor, according to various aspects. The reactor may include any configuration described herein and shown in the various drawings, especially FIGS. 4-7B and/or 10, or may include various components shown therein arranged in any suitable manner that would be appreciated by a person having ordinary skill in the art upon reading the present descriptions.

With continuing reference to FIG. 11, in operation 1104, method 1100 involves dissociating the carbon dioxide and the water using the plasma to form one or more dissociated species. The dissociated species, according to preferred approaches, may include any such species described herein and/or shown in the various drawings, especially with reference to FIGS. 3A-3G and/or 8.

In operation 1106 of FIG. 11, the dissociated species are exposed to an electric field configured to facilitate one or more chemical reactions. Preferably, the electric field is or includes an AC field and/or a pulsed DC field, as described in greater detail hereinabove. The chemical reactions, in various approaches, may include any reaction described herein as suitable for generating solid carbon, and/or as part of a suitable pathway of multiple reactions for generating solid carbon. For instance, reactions shown in, and described with reference to, FIGS. 3A-3G are among preferred reactions to be facilitated in the context of the presently described inventive concepts. In alternative aspects, other final products, such as sulfur-based compounds, may be generated instead of or in addition to solid carbon.

Method 1100 also includes operation 1108, where solid carbon is generated via the chemical reactions. As described in greater detail hereinabove, efficiently generating solid carbon involves the use of water as an input material, as well as fine tuning of the plasma and/or electric field to generate appropriate thermal and/or kinetic conditions for the chemical reactions to occur. For instance, optimal parameters reduce the activation energy required for dissociation and facilitate creation of desired species for participation in subsequent chemical reactions to form the desired final product, e.g., solid carbon in various forms described herein.

In operation 1110, method 1100 involves outputting the solid carbon from the reactor. The solid carbon may be output in any suitable manner that would be appreciated by a person having ordinary skill in the art upon reading the instant disclosure. Preferably, prior to output, the solid carbon is separated from other raw materials (e.g. gases), for example using a gas-solid separator, and is output to an appropriate receptacle.

According to various approaches, method 1100 may include additional or alternative operations and/or features than described immediately above.

For instance, in one aspect facilitating the chemical reactions using the electric field may include modulating a frequency and/or a duty cycle of a control signal generated by a control circuit coupled to the reactor. Moreover, the chemical reactions may include a first reaction configured to generate solid carbon from carbon monoxide and water in a single step; and a second reaction configured to generate solid carbon from carbon monoxide and water in two steps.

Preferably, but by no means necessarily, the carbon dioxide and the water are components of an effluent exhaust stream received from a power generation facility coupled to the reactor, and generating the solid carbon reduces a carbon footprint of the power generation facility.

In various approaches, the solid carbon may be or include one or more materials such as: carbon black, carbon nano-onions (CNOs), necked CNOs, carbon nanospheres, graphite, pyrolytic graphite, graphene, graphene nanoparticles, graphene platelets, fullerenes, hybrid fullerenes, single-walled nanotubes, multi-walled nanotubes, and combinations thereof.

With continuing reference to method 1100, and as noted above, it is advantageous to remove oxygen from the reactor to avoid recombination of various dissociated species therewith in pathways that do not lead to production of solid carbon (or other desired product).

The presently described invention may be embodied as a system, a method, a composition of matter, or combinations thereof, according to various aspects. These aspects may be combined in any suitable manner, and various permutations of features disclosed herein may be included (or excluded) according to different implementations, without departing from the scope of the invention. Exemplary inventive concepts presented in this description include the following, without limitation.

In one aspect, a method for producing solid carbon from carbon dioxide gas and water includes: receiving carbon dioxide and water in a reactor configured to generate a plasma; dissociating the carbon dioxide and the water using the plasma to form one or more dissociated species; exposing the dissociated species to an electric field configured to facilitate one or more chemical reactions; generating solid carbon via the chemical reactions; and outputting the solid carbon from the reactor. The method may additionally or alternatively include any one or more of the following operations/features, according to various approaches. In one approach, the method includes separating the solid carbon from one or more byproducts of dissociating the carbon dioxide and the water, and/or from one or more byproducts of the one or more chemical reactions. In another approach, facilitating the chemical reactions using the electric field comprises modulating a frequency and/or a duty cycle of a control signal generated by a control circuit coupled to the reactor. Moreover, the chemical reactions may include: a first reaction configured to generate solid carbon from carbon monoxide and water in a single step; and/or a second reaction configured to generate solid carbon from carbon monoxide and water in two steps. Generating the solid carbon using the plasma involves causing electron(s) to impact the carbon dioxide and the water, and optionally corresponding dissociated species thereof. Preferably, the carbon dioxide and the water are components of an effluent exhaust stream received from a power generation facility coupled to the reactor. More preferably, generating the solid carbon reduces a carbon footprint of the power generation facility. The solid carbon may include one or more materials selected from the group consisting of: carbon black, carbon nano-onions (CNOs), necked CNOs, carbon nanospheres, graphite, pyrolytic graphite, graphene, graphene nanoparticles, graphene platelets, fullerenes, hybrid fullerenes, single-walled nanotubes, and multi-walled nanotubes. In some approaches, the plasma is characterized by an energy of approximately 100 electron volts (eV), and/or a frequency in a range from about one gigahertz to about five gigahertz. The method may include generating an electric field, e.g., an alternating current and/or a pulsed direct current (DC) field, within the plasma zone and/or the reaction zone. The electric field may be generated using a plurality of electrodes coupled to the reactor, preferably positioned on opposite sides of the plasma zone. The electrodes may be characterized by an approximately 180-degree phase difference. The electric field may be characterized by having a variable strength along a length of the reactor, e.g., due to differing distance between respective electrode(s) and the plasma zone along the length of the reactor. Oxygen may be removed from the reactor during performance of the method, in order to avoid recombination with other species to form products other than the desired output, e.g., solid carbon, sulfur, silicon, etc.

According to another aspect, a system includes a waveguide comprising a plasma zone extending along a length of the first waveguide; a microwave energy source coupled to the waveguide; a first flow inlet configured to flow carbon dioxide gas into the plasma zone; and a gas-solid separator system coupled to the microwave plasma reactor. The microwave energy source is configured to propagate microwave energy into the waveguide; and the microwave energy is configured to generate a plasma within the plasma zone. The plasma within the plasma zone is configured to dissociate the carbon dioxide gas into a plurality of components including oxygen gas and solid carbon particles. Dissociation using the plasma involves causing electron(s) to impact the carbon dioxide and the water, and optionally corresponding dissociated species thereof. The gas-solid separator (GSS) system is configured to receive the plurality of components. Additionally or alternatively, the system may include any combination or permutation of the following components/features, according to various aspects of the inventive concepts presented herein. For instance, the waveguide preferably also includes a reaction zone configured to facilitate one or more chemical reactions for converting the carbon dioxide into the plurality of components. Optionally, an electromagnetic energy source, an ohmic heating device, a dielectric heating device, and/or a phonon heating device may be coupled to the plasma zone, wherein temperature contours in the plasma zone are controlled using the ohmic heating device, the dielectric heating device, the microwave energy device, and/or the phonon heating device. The waveguide may optionally include a second flow inlet configured to deliver carbon dioxide into the plasma zone, and/or a third flow inlet configured to deliver one or more additional materials into a reaction zone of the waveguide, where the one or more additional materials are configured to functionalize the carbon dioxide and/or the plurality of components. Preferably, the plurality of components includes solid carbon. More preferably, the carbon dioxide gas is provided to the first flow inlet from an effluent exhaust stream of a power generation facility. The gas-solid separator (GSS) may be configured to separate gaseous components from the solid carbon particles prior to outputting the solid carbon particles. The system may additionally include at least one receptacle coupled to the gas-solid separator system, where the at least one receptacle is configured to receive the solid carbon particles. The system also may include a plurality of electrodes coupled to the waveguide, wherein the plurality of electrodes is configured to cooperatively generate either or both of an alternating current (AC) field and a pulsed direct current (DC) field. Whether generated using AC or DC, an approximately 180 degree phase difference is preferably maintained between the electrodes. The first flow inlet may be configured to flow the carbon dioxide gas into the plasma zone in a direction parallel to the waveguide.

According to yet another aspect, a system includes a plurality of reaction chambers such as the system described hereinabove. The plurality of reaction chambers are coupled (e.g., in parallel or in series), directly or indirectly, to at least one microwave energy source, at least one amplifier, and at least one receptacle. Each reaction chambers includes a waveguide coupled to the microwave energy source, and each waveguide independently comprises: a plasma zone configured to generate a plasma in response to the microwave energy; at least one inlet configured to deliver raw material into the plasma zone; and an outlet configured to output a powder based on the raw material. Preferably, each reaction chambers comprises or is part of a klystron. The plasma preferably causes electron(s) to impact carbon dioxide and water within the reaction chamber(s), in turn causing dissociation thereof, and optionally the dissociation involves causing electron(s) to impact dissociated species of carbon dioxide and/or water. It shall be understood that systems including a plurality of reaction chambers may include any combination or permutation of components/features/capabilities described hereinabove regarding a single reaction chamber.

According to still yet another aspect of the presently described inventive concepts, a composition of matter includes a carbonaceous material having physical characteristics of being formed from dissociation of carbon dioxide and water using a plasma and an electric field. Preferably, the dissociation is driven by electron(s) impacting chemical species present in a reaction chamber configured to generate a (e.g., microwave) plasma.

The physical characteristics of being formed from dissociation of carbon dioxide and water using at least one plasma may include the carbonaceous material comprising carbonaceous aggregates characterized by a principal dimension having a length in a range from about 1 micron to about 1000 microns. The physical characteristics of being formed from dissociation of carbon dioxide and water using at least one plasma may additionally or alternatively include the carbonaceous material comprising one or more materials selected from the group consisting of: carbon black, carbon nano-onions (CNOs), necked CNOs, carbon nanospheres, graphite, pyrolytic graphite, graphene, graphene nanoparticles, graphene platelets, fullerenes, hybrid fullerenes, single-walled nanotubes, and multi-walled nanotubes. The plasma conferring the physical characteristics is characterized by a frequency in a range from about one gigahertz to about five gigahertz. The plasma may be a microwave plasma; and/or the electric field is either an alternating current (AC) field or a pulsed direct current (DC) field, though AC fields and DC fields may be used in combination, according to various aspects of the invention.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. The description herein of any sequence of actions is not intended to imply that the specific order described for performing that sequence must be followed.

All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The aspects described herein included the one or more modes known to the inventor for carrying out the claimed subject matter. Of course, variations of those aspects will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for producing solid carbon from carbon dioxide gas and water, the method comprising:
   receiving carbon dioxide and water in a reactor configured to generate a plasma;
   dissociating the carbon dioxide and the water using the plasma to form one or more dissociated species;
   exposing the dissociated species to an electric field configured to facilitate one or more chemical reactions, wherein the electric field comprises a pulsed direct current (DC) field;
   generating solid carbon via the chemical reactions; and
   outputting the solid carbon from the reactor.

2. The method as recited in claim 1, comprising separating the solid carbon from one or more byproducts of dissociating the carbon dioxide and the water, and/or from one or more byproducts of the one or more chemical reactions.

3. The method as recited in claim 1, wherein facilitating the chemical reactions using the electric field comprises modulating a frequency and/or a duty cycle of a control signal generated by a control circuit coupled to the reactor.

4. The method as recited in claim 1, wherein the chemical reactions include:
   a first reaction configured to generate solid carbon from carbon monoxide and water in a single step; and
   a second reaction configured to generate solid carbon from carbon monoxide and water in two steps.

5. The method as recited in claim 1, wherein the carbon dioxide and the water are components of an effluent exhaust stream received from a power generation facility coupled to the reactor.

6. The method as recited in claim 5, wherein generating the solid carbon reduces a carbon footprint of the power generation facility.

7. The method as recited in claim 1, wherein the plasma is characterized by an energy of approximately 100 electron volts (eV).

8. The method as recited in claim 1, wherein the plasma is characterized by a frequency in a range from about one gigahertz to about five gigahertz.

9. The method as recited in claim 1, wherein the solid carbon comprises one or more materials selected from the group consisting of: carbon black, carbon nano-onions (CNOs), necked CNOs, carbon nanospheres, graphite, pyrolytic graphite, graphene, graphene nanoparticles, graphene platelets, fullerenes, hybrid fullerenes, single-walled nanotubes, and multi-walled nanotubes.

10. The method as recited in claim 1, comprising removing oxygen from the reactor.

11. The method as recited in claim 1, comprising: generating the electric field using a plurality of electrodes coupled to the reactor, wherein the plurality of electrodes are configured, via being positioned at an angle relative to a principal dimension of a reaction zone in which the plasma is generated, to generate variations in a strength of the electric field within the reaction zone.

12. The method as recited in claim 11, wherein at least two of the plurality of electrodes are characterized by an approximately 180-degree phase difference;
   wherein the at least two of the plurality of electrodes are positioned on opposing sides of the reaction zone and substantially aligned with each other along the principal dimension of the reaction zone.

13. The method as recited in claim 1, wherein the electric field is characterized by a variable strength along a length of a reaction zone of the reactor.

14. The method as recited in claim 1, wherein the electric field further comprises an alternating current (AC) field.

15. The method as recited in claim 1, wherein the dissociating is driven by electron(s) impacting the carbon dioxide and the water; and wherein the electron(s) are characterized by a kinetic energy in a range from about 28 electron volts (eV) to about 100 eV.

16. The method as recited in claim 1, comprising controlling temperatures within an extended length plasma zone of the reactor and/or an extended length afterglow zone of the reactor using the pulsed DC field and/or an alternating current (AC) field.

17. The method as recited in claim 1, comprising controlling temperature contours within a plasma zone of the reactor using one or more thermal plume energy sources.

18. The method as recited in claim 17, wherein the one or more thermal plume energy sources are selected from the group consisting of: an ohmic heating device, a dielectric heating device, an electromagnetic energy source, a phonon heating device, a light energy source, and combinations thereof.

19. The method as recited in claim 1, wherein the plasma comprises a plurality of electrons characterized by a kinetic energy of approximately 100 electron volts (eV);

wherein the dissociated species are formed by impacting at least some of the electrons with the received carbon dioxide and the received water; and wherein the chemical reactions comprise:
- a first reaction configured to generate the solid carbon ($C_{(s)}$) by reacting carbon monoxide (CO) formed within the plasma with dissociated water ($H_2O^+$) formed within the plasma, in a single step; and
- a second reaction configured to generate the solid carbon ($C_{(s)}$) in two steps;

wherein a first step of the second reaction comprises reacting carbon monoxide (CO) formed within the plasma with dissociated hydroxyl ($OH^+$) formed within the plasma to form carbon dioxide ($CO_2$) and hydrogen (H); and wherein a second step of the second reaction comprises reducing carbon monoxide (CO) formed within the plasma with the hydrogen (H) formed within the plasma to form the solid carbon ($C_{(s)}$) and water ($H_2O$).

20. The method as recited in claim 1, wherein the solid carbon comprises graphene;
wherein the method comprises functionalizing one or more surfaces of the graphene with one or more functional groups; and
wherein the one or more functional groups comprise: fluorine, oxygen, nitrogen, or combinations thereof.

* * * * *